(12) United States Patent
Takagi

(10) Patent No.: US 7,555,700 B2
(45) Date of Patent: Jun. 30, 2009

(54) DATA REPEATING DEVICE AND DATA COMMUNICATIONS SYSTEM WITH ADAPTIVE ERROR CORRECTION

(75) Inventor: Yoshinobu Takagi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 566 days.

(21) Appl. No.: 11/172,997

(22) Filed: Jul. 5, 2005

(65) Prior Publication Data
US 2006/0184860 A1 Aug. 17, 2006

(30) Foreign Application Priority Data
Feb. 16, 2005 (JP) .............................. 2005-038579

(51) Int. Cl.
*H03M 13/00* (2006.01)
(52) U.S. Cl. .................................................... 714/774
(58) Field of Classification Search ................. 714/748, 714/752, 776, 786, 774
See application file for complete search history.

(56) References Cited

U.S. PATENT DOCUMENTS 6,148,422 A * 11/2000 Strawczynski et al. ...... 714/704
6,252,888 B1 * 6/2001 Fite et al. ..................... 370/466
6,766,492 B2 * 7/2004 Cheung ....................... 714/776
7,047,000 B1 * 5/2006 Ojala ....................... 455/422.1
7,155,538 B1 * 12/2006 Rossello et al. ............. 709/249
7,328,393 B2 * 2/2008 Chawla et al. .............. 714/774

OTHER PUBLICATIONS

Patent Abstracts of Japan: Yano Koichi et al., "Data Communication System, Data Communication Unit, Data Communication Method and Storage Medium," Japanese Publication No. 2001-045098; Publication Date: Feb. 16, 2001.

* cited by examiner

*Primary Examiner*—Esaw T Abraham
(74) *Attorney, Agent, or Firm*—Fujitsu Patent Center

(57) ABSTRACT

A data repeating device that can maintain the data integrity in error-prone circumstances. A network system involves a data communications device and a data repeating device interconnected via a transmission line. The data repeating device has an error detector for detecting a failure, based on errors found in received frames. Upon detection, a frame generator transmits an error correction enable frame to the data communications device, thereby requesting the use of error correction coding. Inside the data communications device, a correction activation flag is set in response to the received error correction enable frame, which indicates that error correction coding is to be applied. The active state of this flag permits an error correction coder to add an error correction code to each outgoing frame, thereby creating error correction coded frames for transmission over the transmission line.

7 Claims, 26 Drawing Sheets

DATA REPEATING DEVICE AND DATA COMMUNICATIONS SYSTEM WITH ADAPTIVE ERROR CORRECTION

CROSS-REFERENCE TO RELATED APPLICATIONS

This application is based upon and claims the benefits of priority from the prior Japanese Patent Application No. 2005-038579, filed on Feb. 16, 2005, the entire contents of which are incorporated herein by reference.

BACKGROUND OF THE INVENTION

1. Field of the Invention

The present invention relates to a data repeating device that receives and forwards network data signals at the physical layer, a data communications device that processes network data at the data link layer or above, and a data communications system including those apparatuses. More particularly, the present invention relates to a data repeating device, a data communications device, and a data communications system having a mechanism for enhanced data integrity.

2. Description of the Related Art

Recent years have seen an increased number of devices with a local area network (LAN) interface for use with Internet Protocol (IP) networks, not only for computer communications, but also for voice communications such as IP telephony services. Those IP network devices (or IP devices) are broadly classified into two categories: intelligent devices having a central processing unit (CPU) to implement sophisticated functions with software programs, and CPU-less devices without software control. IP devices in the former category, or software-controlled devices, include switching hubs, IP routers, media converters, computer network interface cards. Generally, those devices have the functions of processing packets at the data link layer or above. IP devices in the latter category, on the other hand, handle network signals only at the physical layer to repeat (i.e., receive and forward) packets. Such devices include simple media converters designed only for the transport of main data signals.

Network systems are often structured in a hierarchical manner, from access networks to trunk networks. Bit error rate requirements in a particular network depend on where in the system hierarchy that network is. Generally a network located closer to the core network (i.e., trunk transmission facilities interconnecting communications carriers) is supposed to be more reliable and stable. With the increased use of both types of IP devices mentioned above, the requirements for their service quality will also increase up to a level comparable to Synchronous Optical Network (SONET) or Synchronous Digital Hierarchy (SDH).

Because of their enhanced control capabilities, software-controlled IP devices fulfill such service requirements by taking advantage of various measures including bit error monitoring, forward error correction (FEC), and dynamic routing control. By contrast, software-less physical-layer network devices are designed primarily for transmission of main data signals, without putting much consideration into bit errors or the like.

FIG. 24 shows a first example of a conventional data communications system. This system is an IP network using physical-layer media converters. Specifically, two layer-2 (L2) switches 911 and 914 are interconnected via CPU-less media converters 912 and 913, where the media converters 912 and 913 convert data signals at the physical layer (i.e., optical to electrical, and vice versa).

The leftmost L2 switch 911 and media converter 912 are interconnected via an Ethernet (registered trademark of Xerox Corporation) connection using an unshielded twisted pair (UTP) cable. This part is referred to as a LAN link 915. Likewise, the rightmost L2 switch 914 and media converter 913 are interconnected via a LAN link 916 with a UTP cable. The two media converters 912 and 913 are interconnected by a fiber-optic link 917. For this optical connection, the media converters 912 and 913 have single-fiber bidirectional optical modules (not shown).

Specifically, the above data communications system operates in the following way:

(a) The L2 switch 911 transmits a normal frame 921, which is received by a media converter 912.

(b) The media converter 912 retransmits the received normal frame 922 to another media converter 913. It is supposed here that the frame 922 suffers an error on the fiber-optic link 917 for some reason.

(c) The media converter 913 receives a distorted frame 923. The media converter 913 thus delivers it as a distorted frame 924 to the L2 switch 914.

(d) The L2 switch 914 discards the received frame 924 because its data is corrupted.

FIG. 25 shows a second example of a conventional data communications system. This system includes media converters 931 and 932 that operate at the physical and data link layers, based on the TS-1000 specifications standardized by Telecommunication Technology Committee (TTC) in Japan for Fiber-to-the-Home (FTTH) applications. The media converters 931 and 932 are interconnected by a fiber-optic link 935, besides being coupled to their nearest LAN segments via LAN links 933 and 934, respectively. Frames 936 are transported through those media converters 931 and 932.

The two media converters 931 and 932 in the system of FIG. 25 play different roles, the former as a center-side device and the latter as a terminal-side device. The center-side media converter 931 has a CPU to control the terminal-side media converter 932. The CPU performs, for example, a loopback test to detect failure. The center-side media converter 931 remotely monitors the state of the terminal-side media converter 932, including its link fault, power disruption, and hardware failure. Specifically, the center-side media converter 931 sends a supervisory frame ("Request") to the terminal-side media converter 932 and checks whether the terminal-side media converter 932 returns a supervisory response frame ("Response").

The center-side media converter 931 can also cause the terminal-side media converter 932 to generate an alert (e.g., packet error alert). Yet another function of the center-side media converter 931 is to remotely configure the terminal-side media converter 932.

FIG. 26 shows a third example of a conventional data communications system. This system uses error correction functions (e.g., FEC and Read-Solomon coding) for reliable transmission of frames between distant L2 switches 941 and 944. The two L2 switches 941 and 944 are interconnected via CPU-less media converters 942 and 943 that process data signals at the physical layer.

In FIG. 26, the leftmost L2 switch 941 and media converter 942 are interconnected via a LAN link 945. Similarly, the rightmost L2 switch 944 and media converter 943 are interconnected via a LAN link 946. Two media converters 942 and 943 are interconnected via a fiber-optic link 947. For this optical connection, the media converters 942 and 943 have single-fiber bidirectional optical modules.

For example, the data communications system of FIG. 26 operates in the following way:

(a) The L2 switch 941 transmits a normal frame 951, which is received by a media converter 942.

(b) The media converter 942 retransmits a normal frame 952 to another media converter 943. It is supposed here that the frame 952 suffers an error on the fiber-optic link 947.

(c) The media converter 943 thus receives a distorted frame 953. The media converter 943 retransmits it intact as a distorted frame 954 to the L2 switch 944.

(d) The L2 switch 944 recovers the original transmission data from the received frame 954 by correcting its error with the FEC algorithm that is implemented.

The use of error correction techniques enables the receiving device (i.e., L2 switch 944 in the present example) to correct errors that may be introduced to the transmitted frames due to a failure of the transmission line or network device. Various data communications systems with FEC have been proposed. See Japanese Unexamined Patent Publication 2001-45098, for example.

It should be noted here that media converters and other packet repeating devices operating only at the physical layer simply forward received packets to subsequent devices, whether their data is corrupted or not. Data errors can primarily be categorized into two groups: those produced on a transmission line and those produced in a network device. The causes of errors in the former group include transmission line loss, poor fiber bandwidth characteristics, and noises. The errors in the latter group range from temporary, recoverable errors (e.g., synchronization error) to permanent, unrecoverable errors (e.g., hardware failure).

With respect to the issue of data errors mentioned above, the system using physical-layer media converters illustrated in FIG. 24 has the following drawbacks:

(a) Packet errors can only be detected by upper-layer devices such as switching hubs. But they are unable to identify the failure location (e.g., on a transmission line, inside a media converter, or anywhere else).

(b) Corrupted frames are allowed to travel over the transmission line until they are terminated at a layer-2 device.

Therefore, the system of FIG. 24 cannot locate the cause of packet errors.

In the network system discussed in FIG. 25, error monitoring functions can be implemented since the system includes an intelligent media converter having a CPU. This system, however, has the following drawbacks:

(a) Corrupted frames are allowed to travel over the transmission line until they are terminated at a layer-2 device.

(b) While being able to monitor the number of corrupted packets and total transmitted packets, the media converter provide no further functions such as selecting new links or correcting errors.

(c) The cost of the center-side media converter is inevitably increased because of the use of a CPU for software-based control capabilities.

(d) The supervisory functions are intended for an optical link between a central device and a terminal device, as in an FTTH network. LAN links, on the other hand, are out of the coverage.

The system of FIG. 26 uses error correction coding to improve the resilience to frame data errors. However, this system has a drawback in that every frame has to carry an additional code for error correction even in normal circumstances where no errors are encountered on the transmission line. Transmitting those extra bits reduces the efficiency of data transmission.

As can be seen from the above discussion, network systems need a mechanism of correcting errors automatically even if frequent errors are produced due to, for example, a poor bandwidth of fiber optic media. While the use of error correction coding is an effective solution for this demand, conventional systems sacrifice the efficiency of data transmission in normal conditions, giving higher priority to the data integrity in error-prone circumstances.

SUMMARY OF THE INVENTION

In view of the foregoing, it is an object of the present invention to provide a data repeating device, data communications device, and data communications system that can maintain the data integrity in error-prone circumstances, without sacrificing the efficiency of transmission in normal conditions.

To accomplish the above object, the present invention provides a data repeating device that repeats network data signals at the physical layer. This data repeating device has an error detector that detects a failure, based on errors found in received frames. The device also has a frame generator that produces and transmits an error correction enable frame in response to the failure detected by the error detector. The error correction enable frame is sent to a network device that processes network data at the data linked layer or above, thus requesting the network device to start using error correction coding.

Also, to accomplish the above object, the present invention provides a data communications device that processes network data at the data link layer or above. This data communications device is coupled to a data repeating device via a transmission line and has the following elements: a frame detector, a register, a setting unit, and an error correction coder. The frame detector detects an error correction enable frame from among frames received from the data repeating device. In response to the error correction enable frame, the setting unit sets a correction activation flag in the register to indicate that error correction coding is to be used in transmission of subsequent frames. The error correction coder adds an error correction code to each outgoing frame to the data repeating device when the correction activation flag is set in the register, thereby creating error correction coded frames for transmission over the transmission line.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
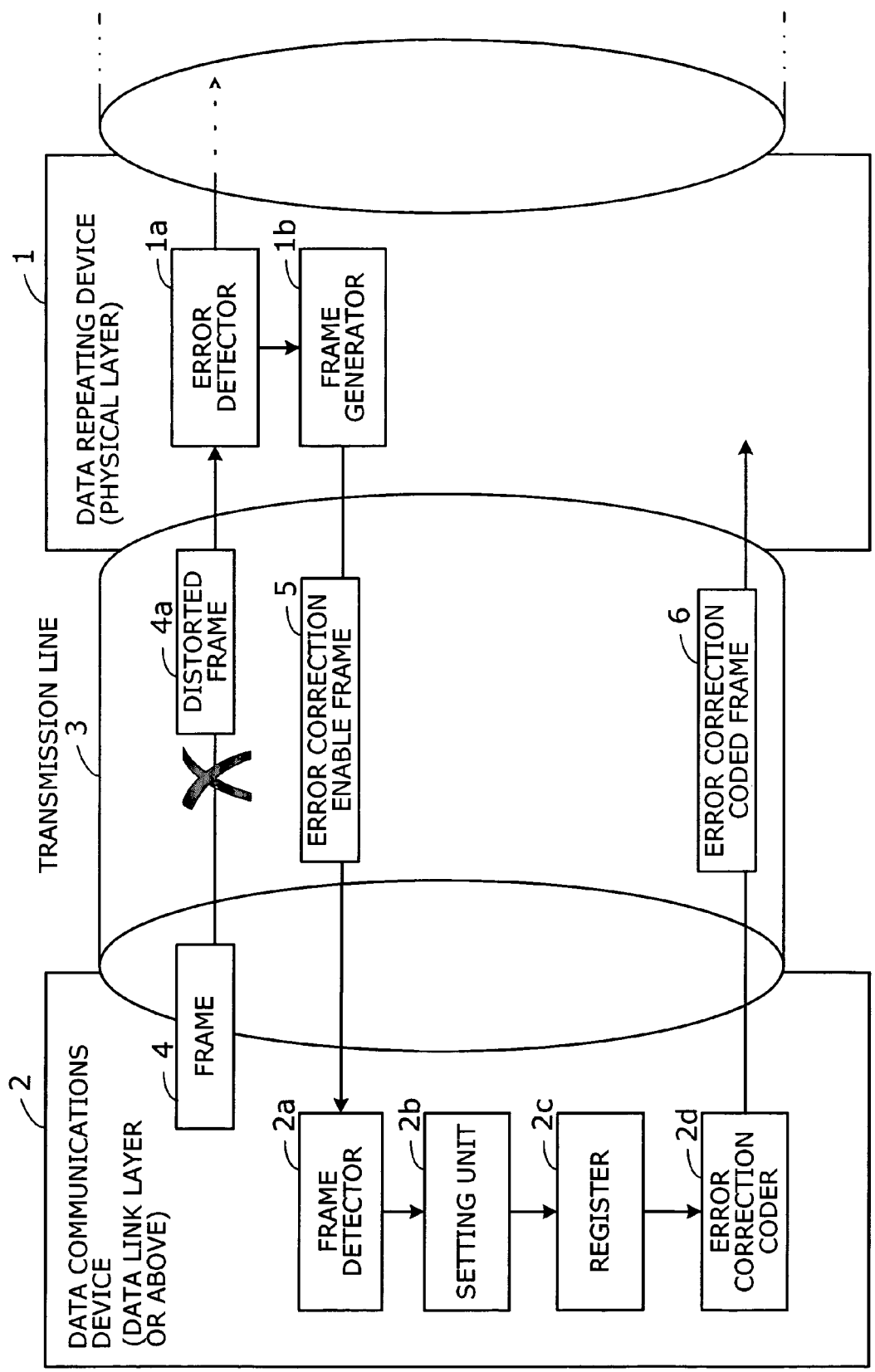
FIG. 1 provides an overview of an embodiment of the present invention.

Preferred embodiments of the present invention will be described below with reference to the accompanying drawings, wherein like reference numerals refer to like elements throughout.

FIG. 1 provides an overview of an embodiment of the present invention. This embodiment involves a data repeating device 1 and a data communications device 2 interconnected via a transmission line 3. The data repeating device 1 is a network device that operates on the physical layer to repeat (i.e., receive and retransmit) data signals. Devices of this type may be called a repeater or repeater hub. The data repeating device 1 has an error detector 1a and a frame generator 1b. The error detector 1a detects a failure, based on errors found in received frames 4. When, for example, the occurrence rate of distorted frames (or frames with bit errors) 4a has reached a predetermined threshold, the error detector 1a identifies it as a failure. Upon detection of a failure, the frame generator 1b produces an error correction enable frame and send it over the transmission line. This error correction enable frame is a special frame that instructs the recipients to begin using error correction coding.

The data communications device 2 is a network device whose data processing functions include those on the data link layer. It may also include upper-layer processing functions above the data link layer. This data communications device 2 has, among others, a frame detector 2a, a setting unit 2b, a register 2c, and an error correction coder 2d.

The frame detector 2a detects an error correction enable frame 5 from among the frames received through the transmission line 3. Upon detection of this error correction enable frame 5, the setting unit 2b sets a correction activation flag in the register 2c to indicate that error correction coding is to be used in transmission of subsequent frames. With the correction activation flag set in the register 2c, the error correction coder 2d adds an error correction code to each outgoing frame to be transmitted toward the data repeating device 1 and outputs the resulting error correction coded frame 6 to the transmission line 3.

The data communications system described above operates as follows. Suppose that a frame 4 transmitted from the data communications device 2 experiences a data error because of some problem with the transmission line 3. The frame 4 is thus distorted before it reaches the data repeating device 1. Upon receipt this distorted frame 4a, the error detector 1a in the data repeating device 1 recognizes the presence of a failure from the error detected in the received frame 4a. The failure detection triggers the error detector 1a to produce an error correction enable frame 5 that requests the use of error correction coding. The error correction enable frame 5 is transmitted to the data communications device 2, which has data processing functions at the data link layer or above.

The data communications device 2 receives incoming frames through the transmission line 3. In the present context, the frame detector 2a finds the error correction enable frame 5 among the received frames. This event causes the setting unit 2b to set a correction activation flag in a certain portion of the register 2c, thus indicating that each outgoing frame is supposed to be error correction coded to prevent loss of data. When this flag is set, the error correction coder 2d calculates and adds an error correction code to every frame directed to the data repeating device 1. The resulting error correction coded frames 6 are thus transmitted over the transmission line 3.

The above-described mechanism permits the system to begin to use error correction coding in data communication in the event of a failure detected at the physical-layer data repeating device 1. Data quality can be maintained at a high level even in an error-prone situation since the error correction code added to each frame enables the original data to be recovered from the distorted frame at the receiving end. Advantageously, the proposed system does not sacrifice the efficiency of data transmission in normal situations, since data is carried on simple frames without the overhead of error correction coding, as long as the data repeating device can receive frames with not errors.

System using Media Converters

Media converters repeat network data signals at the physical layer, from, for example, optical signals to electrical signals and vice versa. This section will describe a more specific embodiment of the present invention, assuming a data communications system using media converters.

Figure 2:
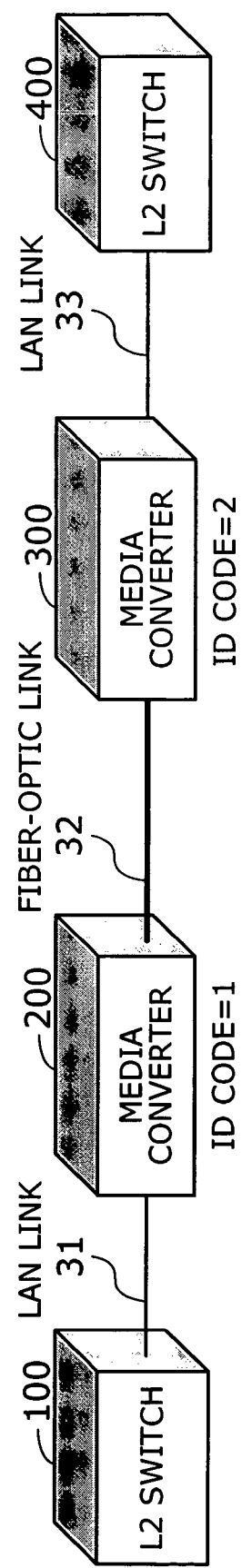
FIG. 2 shows an example system configuration according to an embodiment of the present invention.
Figure 7:
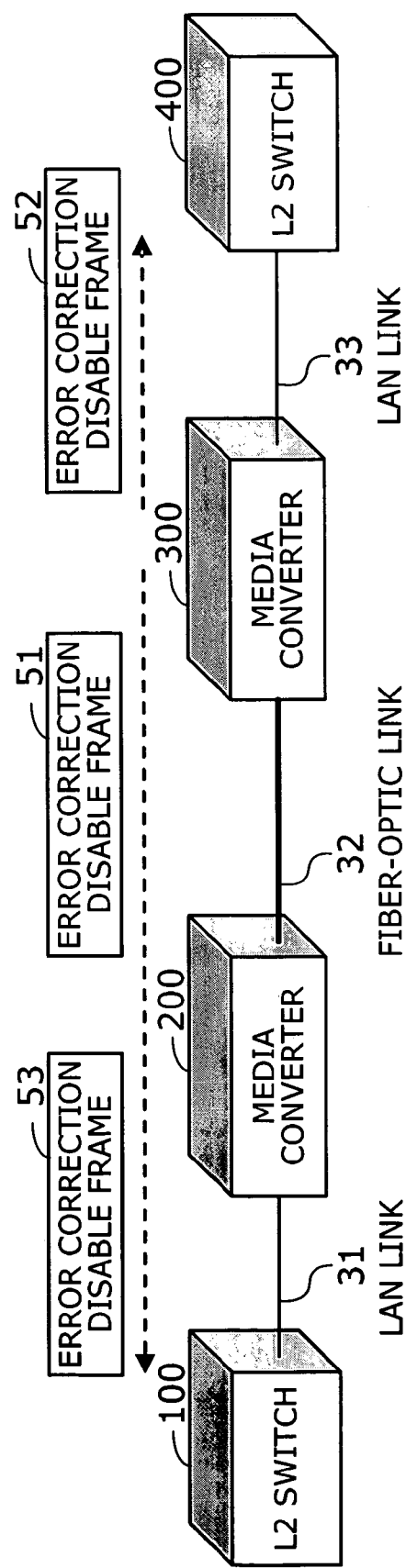
FIG. 7 shows how error correction disable frames are transferred.

FIG. 2 shows an example system configuration according to an embodiment of the present invention. In this example system, two distant L2 switches 100 and 400 are interconnected via two CPU-less media converters 200 and 300. The media converters 200 and 300 process data signals at the physical layer, converting between electrical signals and optical signals. In FIG. 7, the leftmost L2 switch 100 is coupled to the media converter 200 through a LAN (Ethernet) link 31 using an unshielded twisted pair (UTP) cable. Likewise, the rightmost L2 switch 400 is linked to the media converter 300 through a UTP LAN link 33. The two media converters 200 and 300 are interconnected via a fiber-optic link 32. Single-fiber bidirectional optical modules (not shown) are disposed in the media converters 200 and 300 for this optical connection.

The media converters 200 and 300 have their own identifiers, so that the L2 switches 100 and 400 can distinguish them. Specifically, in the example system of FIG. 2, the media converter 200 has an identifier of "1," and the media converter 300 has an identifier of "2." Since single-fiber bidirectional optical modules are used in the present embodiment, the identifiers can be determined on the basis of combinations of optical wavelengths that each media converter uses. For example, an identifier "1" may be given to a converter with TX=1.3 μm and RX=1.55 μm, and another identifier "2" to a converter with TX=1.55 μm and RX=1.3 μm, where TX and RX denote the output wavelength and input wavelength, respectively. In the case of media converters having dual-fiber optical modules, their identifiers may be set manually with a dual in-line package (DIP) switch.

Figure 3:
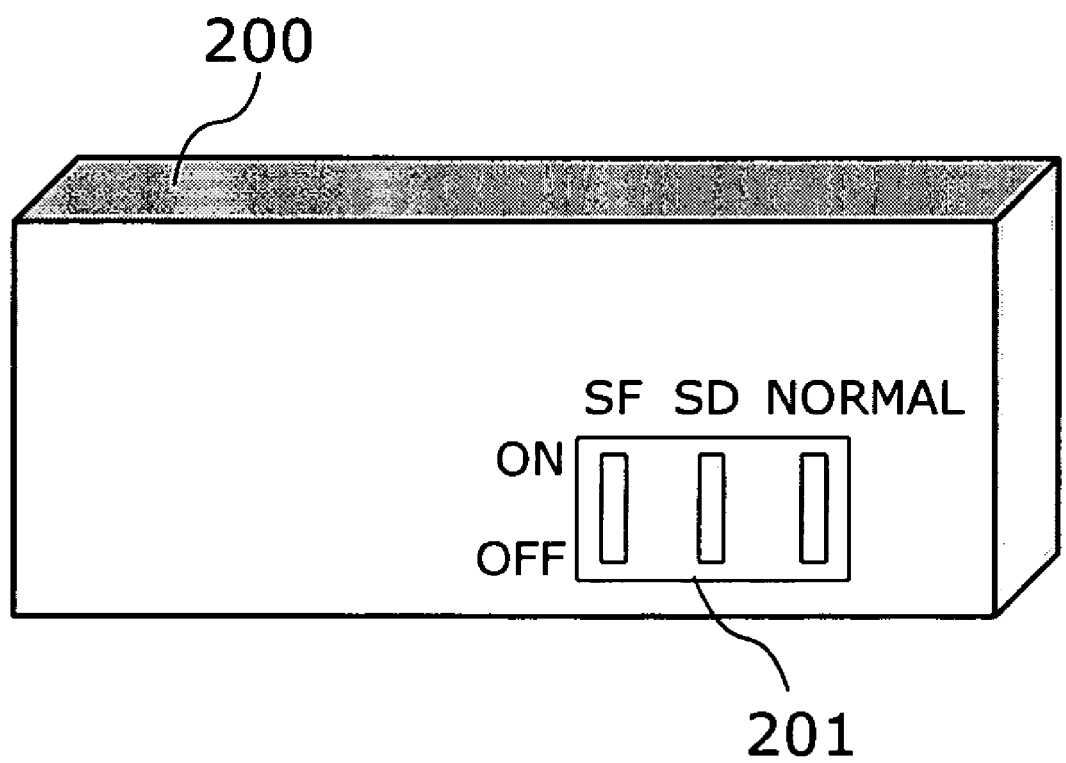
FIG. 3 shows a DIP switch for setting an allowable range of error rates of received frames.

The media converters 200 and 300 are designed to be configurable as to how much receive frame error they would tolerate in physical-layer signal processing. For setting a threshold of the number of frames received with errors (or error occurrence rate), they have a piece of hardware, or more specifically, a DIP switch in the present embodiment. FIG. 3 shows and example of a DIP switch provided in the media converter 200 for the purpose of threshold setting. The illustrated DIP switch 201 offers three ON/OFF switch elements for setting three bits of data. Each switch element is associated with a particular range of bit error rates (BER) above which a frame error will be signified, where BER means the ratio of distorted frames to total received frames. More specifically, the following switches are arranged from left to right in the example of FIG. 3:

SF (Signal Fail): BER between $10^{-3}$ and $10^{-5}$ (error is raised when $BER \geqq 10^{-3}$)

SD (Signal Degrade): BER between $10^{-5}$ and $10^{-11}$, (error is raised when $BER \geqq 10^{-5}$)

NORMAL: BER $10^{-11}$ or greater (error is raised when $BER \geqq 10^{-11}$)

For example, the following switch setup configures the media converter to raise an error signal when the instances of frame check sequence (FCS) error reaches the SF level:

SF (leftmost switch): ON
SD (central switch): OFF
NORMAL (rightmost switch): OFF A media converter may check the number of distorted frames, instead of BERs, to detect a failure. In this case, a threshold number is specified with a DIP switch. The DIP switch has, for example, four switch elements giving a code such as "on, off, off, off" so as to raise a failure upon reception of 1000 frames with FCS error. In this way, the user can specifies a desired threshold through the use of DIP switches.

Figure 4:
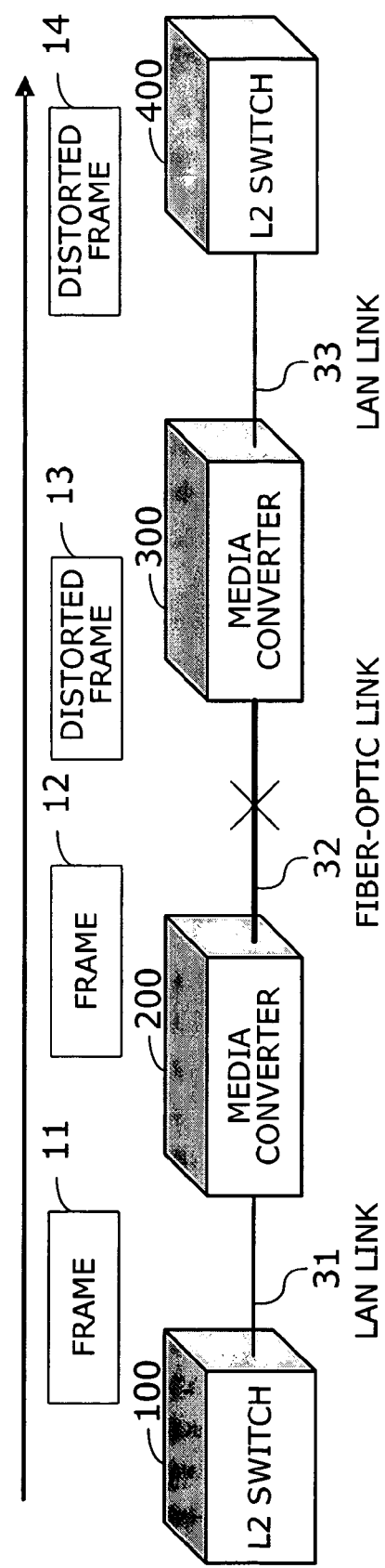
FIG. 4 shows frames transmitted when a failure occurs on a fiber-optic transmission line.

Referring to FIG. 4, the operation of the above data communications system is shown. This example assumes a flow of frames from one L2 switch 100 to another L2 switch 400. It also assumes that a failure occurs on a fiber-optic transmission line. In this situation, the data transmission proceeds as follows:

1. The originating L2 switch 100 transmits a normal frame 11, which is received by the media converter 200.
2. The media converter 200 retransmits the received frame to the media converter 300 as a normal frame 12. It is supposed here that the frame 12 suffers a frame error on the fiber-optic link 32.
3. The media converter 300 receives a distorted frame 13. The media converter 300 thus retransmits it as a distorted frame 14 to the L2 switch 400.
4. The L2 switch 400 discards the received frame 14 since it is corrupted.

The media converter 300 counts the number of distorted frames, and when that number exceeds a predetermined threshold, the media converter 300 sends an error correction enable frame to its upper-layer processors (i.e., L2 switches 100 and 400 in the present case).

Figure 5:
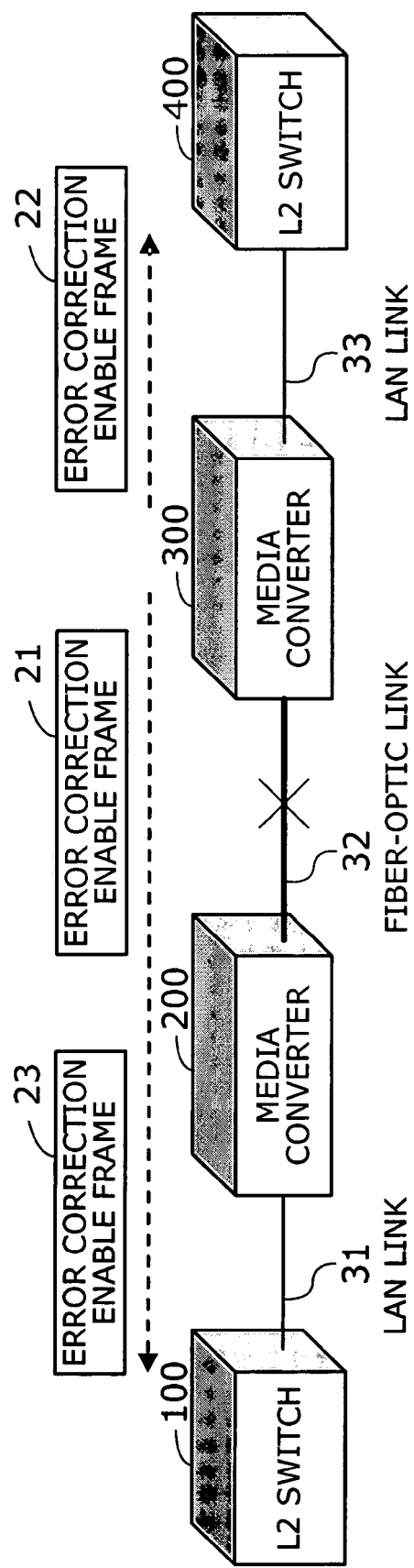
FIG. 5 shows how error correction enable frames are transferred.

FIG. 5 shows how error correction enable frames are transferred. Specifically, the media converter 300 sends out error correction enable frames 21 and 22 toward the L2 switches 100 and 400, respectively, in response to the excessive errors that it has experienced. The former error correction enable frame 21 is first received by the media converter 200 and forwarded to the L2 switch 100 as an error correction enable frame 23. The two error correction enable frames 22 and 23 thus reach the L2 switches 100 and 400, respectively.

When sending those error correction enable frames 21 and 22, the originating media converter 300 includes its own identifier in them. Also included are destination addresses, so that the receiving L2 switches 100 and 400 can recognize that those frames are directed to themselves.

The error correction enable frames 21 and 22 are FEC-coded to increase the resilience to loss of data, which could occur on the way to their destinations. This is preferable particularly in the case where single-fiber bidirectional transceiver modules are used, because the media converters 200 and 300 send and receive every frame, including error correction enable frames, over the same fiber-optic medium that supposedly have some problem.

The media converter 300 actually transmits a predetermined number (e.g., 100 or 200) of error correction enable frames 21 and 22. By doing so, the media converter 300 can ensure the delivery of its request to the intended devices in an error-prone situation. Even if the destination device failed to receive the first error correction enable frame successfully, it would be able to receive one of the subsequent frames correctly with the help of FEC.

From the received error correction enable frames 21 and 22, the L2 switches 100 and 400 realize that a failure has occurred somewhere on the transmission line or at a particular network device. Since each error correction enable frame 21 and 22 contains the identifier of the sending media converter 300, the receiving L2 switches 100 and 400 can identify which media converter has originated the frames.

The L2 switches 100 and 400 may be configured to recognize a failure only when a predetermined number (e.g., three) of error correction enable frames 21 and 22 are received consecutively. In this case, a single isolated error correction enable frame would be neglected, meaning that the L2 switches 100 and 400 filter out false error correction enable frames that could be produced accidentally from garbled normal frames as a result of some problem.

Figure 6:
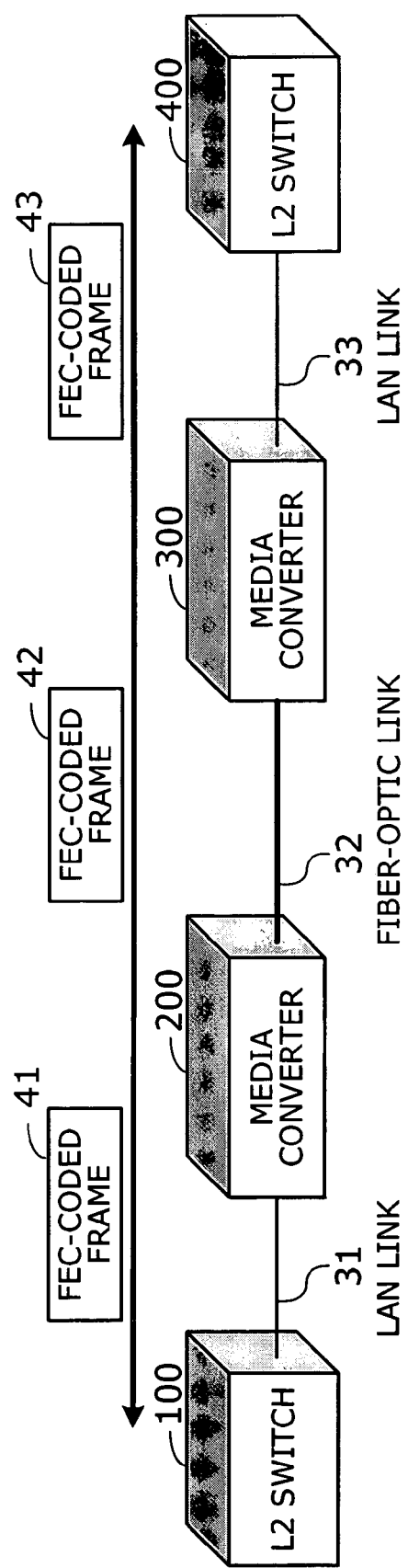
FIG. 6 shows a state of the system in which FEC-coded frames are transferred.

Upon recognition of a problem with the transmission line or the like, the L2 switches 100 and 400 configure themselves to begin to use FEC coding in sending and receiving subsequent frames that carry main data signals. The physical-layer media converters 200 and 300 simply forward those FEC-coded frames. FIG. 6 shows a state of the system in which FEC-coded frames are transferred. As seen, all frames 41, 42, and 43 that the L2 switches 100 and 400 send and receive have an FEC field for protection against errors.

The L2 switches 100 and 400 may be designed to send an error correction control frame before they start sending data frames with FEC. They exchange a pair of error correction control frames to inform each other of their intention of switching from non-FEC mode to FEC mode, thereby making communications more reliable.

As can be seen from the above, the present embodiment enables FEC coding automatically in response to a failure that is detected, thus maintaining the quality of data communications service transparently to end users even when the transmission lines are suffering degradation.

After the problem is fixed and the bit error rate falls below the threshold specified by the DIP switch 201, the media converter 300 sends an error correction disable frame in the way shown in FIG. 7. Specifically, error correction disable frames 51 and 52 are sent to the L2 switches 100 and 400, respectively, from the media converter 300 that detected the failure in the first place. The former error correction disable frame 51 is first received by the media converter 200 and forwarded to the L2 switch 100 as an error correction disable frame 53. Those two error correction disable frames 52 and 53 reach the L2 switches 100 and 400, respectively. When sending those error correction disable frames 51 and 52, the originating media converter 300 includes its own identifier in them. Also included are destination addresses, so that the L2 switches 100 and 400 can recognize that those frames are directed to themselves.

The media converter 300 actually transmits a predetermined number (e.g., 100 or 200) of error correction disable frames 51 and 52. By doing so, the media converter 300 can ensure the delivery of its request to the intended devices in an error-prone situation. Even if the destination device failed to receive the first error correction disable frame successfully, it would be able to receive one of the subsequent frames correctly with the help of FEC.

From the received error correction disable frames 51 and 52, the L2 switches 100 and 400 realize that the cause of the once-existing failure is now removed. The L2 switches 100 and 400 may be configured to recognize removal of the cause only when a predetermined number of error correction disable frames 51 and 52 are received consecutively. For example, they may require three consecutive frames to provide triple-redundant protection. In this case, a single isolated error correction disable frame would be neglected, meaning that the L2 switches 100 and 400 filter out false error correction disable frames that could be produced accidentally from garbled normal frames as a result of some problem.

Figure 8:
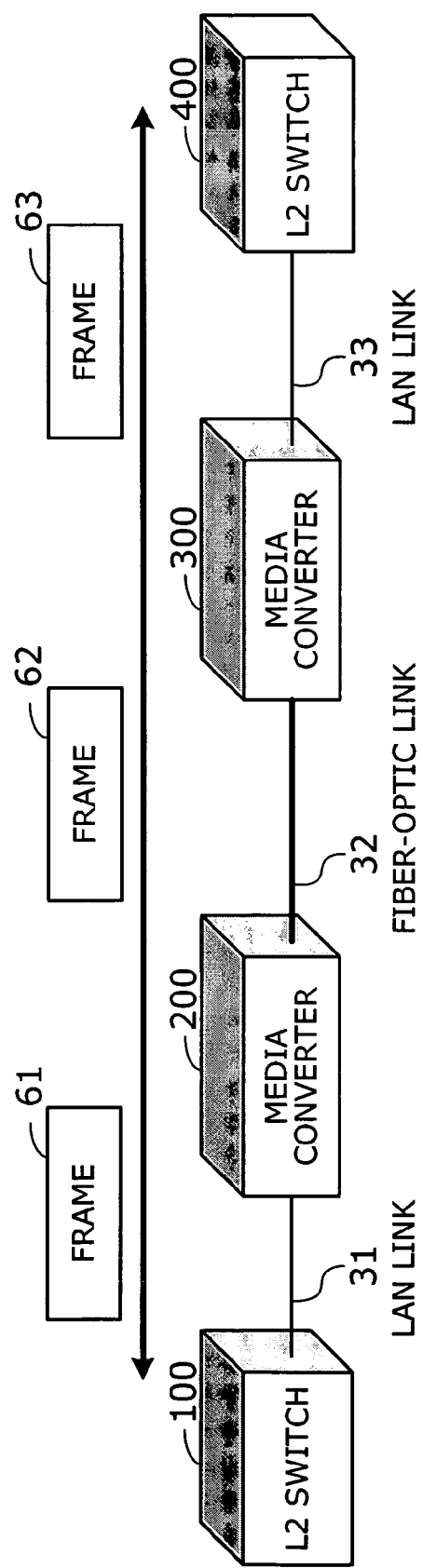
FIG. 8 shows normal frames transferred over the network after the problem is solved.

Upon recognizing recovery of the transmission line or the like, the L2 switches 100 and 400 configure themselves to stop using FEC coding in sending and receiving subsequent frames that carry main data signals. The physical-layer media converters 200 and 300 simply forward those non-FEC frames. FIG. 8 shows frames transferred over the network after the problem is solved. As can be seen, none of the frames 61, 62, and 63 that the L2 switches 100 and 400 send and receive are FEC coded.

To make communications more reliable, the L2 switches 100 and 400 may send an error correction control frame before reverting to non-FEC mode. They can transmit this frame only if they have received an error correction disable frame with the same identifier as that found in the original error correction enable frame. The L2 switches 100 and 400 exchange a pair of error correction control frames to inform each other of their intention of turning off the FEC mode.

Frame Transmission Sequence

Figure 9:
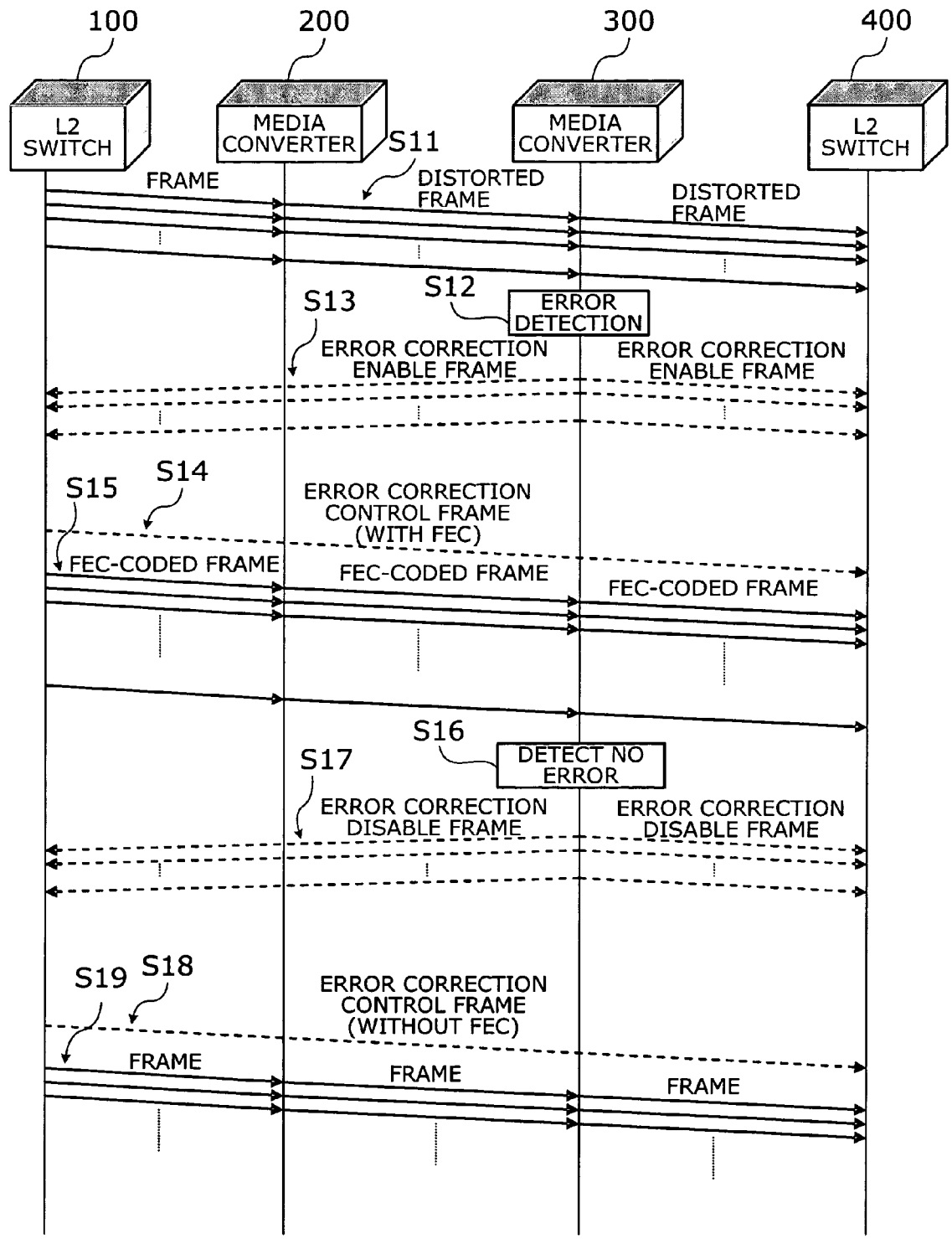
FIG. 9 is a sequence diagram showing frames sent back and forth between network devices.

This section describes how frames are exchanged between network devices, with reference to a sequence diagram of FIG. 9. FIG. 9 shows a series of frames sent back and forth between L2 switches 100 and 400 and media converters 200 and 300.

The example sequence shown in FIG. 9 assumes that one L2 switch 100 is sending main data signals to another L2 switch 400 by using non-FEC frames. Suppose that, in the middle of the transmission, a failure has occurred at some point between the two media converters 200 and 300. The media converter 300 thus receives distorted frames as a result of the failure, which are then transferred intact to the destination L2 switch 400 (step S11). When the number of those distorted frames exceeds a predetermined threshold, the media converter 300 recognizes it as an indication of a failure (step S12). The media converter 300 therefore transmits an error correction enable frame to the L2 switch 100 and 400 (step S13). This frame is repeated a predetermined number (e.g., several tens to one hundred) of times. Upon receipt of as many error correction enable frames as specified (e.g., three frames), the L2 switch 100 sends an error correction control frame to its peer L2 switch 400 before enabling FEC coding (step S14). All data frames subsequently transmitted from the L2 switch 100 are FEC coded (step S15).

The frames received by the media converter 300, however, may still be distorted as long as the problem with the transmission line remains unsolved. While the resulting FEC errors propagate to the destination L2 switch 400, the FEC algorithm permits the receiving L2 switch 400 to reproduce correct data from those FEC-coded frames received with errors.

If the FEC error rate observed by the media converter 300 falls below a predetermined threshold, the media converter 300 interprets it as recovery of the transmission line (step S16). An error correction disable frame is thus transmitted from the media converter 300 to both L2 switches 100 and 400 (step S17), repeatedly as many times as specified previously (e.g., several tens to one hundred).

Upon receipt of as many error correction disable frames as specified (e.g., three frames), the L2 switch 100 sends an error correction control frame to its peer L2 switch 400 before actually disabling FEC coding (step S18). All data frames subsequently transmitted from the L2 switch 100 will be plain frames without FEC (step S19).

In the way described above, the present embodiment enhances the resilience of frames against transmission errors temporarily when a failure occurs, thereby maintaining the quality of communications service. This mechanism can be implemented in media converters without requiring intervention of CPU software, or without sacrificing transmission performance.

Frame Data Format

Figure 10:
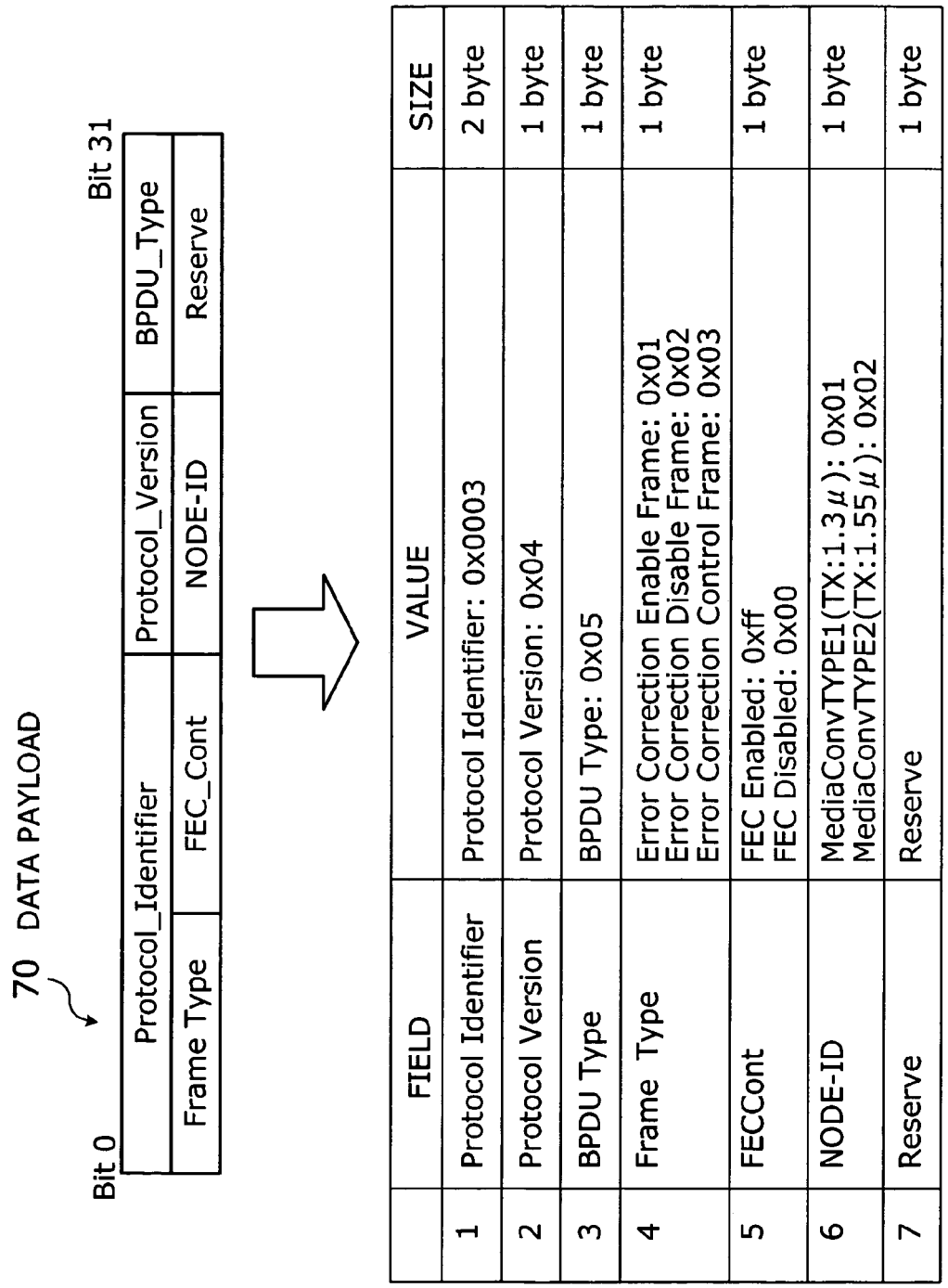
FIG. 10 shows a format of frames used to enable, disable, or control error correction.

FIG. 10 shows a data format of frames used to enable, disable, or control error correction. Illustrated is a data payload of Ethernet frames, in which an error correction enable/disable/control frame is contained. Specifically, the data payload 70 is 64 bits in length, composed of the following data fields: "Protocol_Identifier," "Protocol_Version," "BPDU_Type," "Frame Type," "FEC_Cont," "Node-Id", and "Reserve."

The Protocol_Identifier field contains a two-byte identifier that indicates what protocol is used, and the Protocol_Version field, one byte in length, identifies the version of that protocol. The BPDU_Type field, also one byte in length, indicates the Bridge Protocol Data Unit (BPDU) type. The Frame Type field contains a one-byte identifier that indicates whether the frame is an error correction enable frame, or an error correction disable frame, or an error correction control frame.

According to the present embodiment, this identifier takes a value of "0x01" for error correction enable frames, "0x02" for error correction disable frames, and "0x03" for error correction control frames.

The FEC_Cont field contains a one-byte parameter that specifies whether data is transmitted with FEC or without FEC. According to the present embodiment, FEC_Cont takes a value of "0xFF" for FEC mode and "0x00" for non-FEC mode. The Node-ID field contains a one-byte identifier that indicates the source of the frame. For one example, an identifier "0x01" s set to the frames to be transmitted from the media converter 200 with a transmit wavelength TX=1.3 μm. For another example, an identifier "0x02" is set to the frames to be transmitted from the media converter 300 with a transmit wavelength TX=1.55 μm. The Reserve field is a one-byte space for future use.

A frame is actually formed from the data payload 70 of FIG. 10 and some additional information. The latter includes a 48-bit destination MAC address (e.g., 01:80:C2:00:00:XX), a 48-bit source MAC address, and an 8-bit LLC, where MAC stands for "Media Access Control" and LLC "Logical Link Control."

Figure 11:
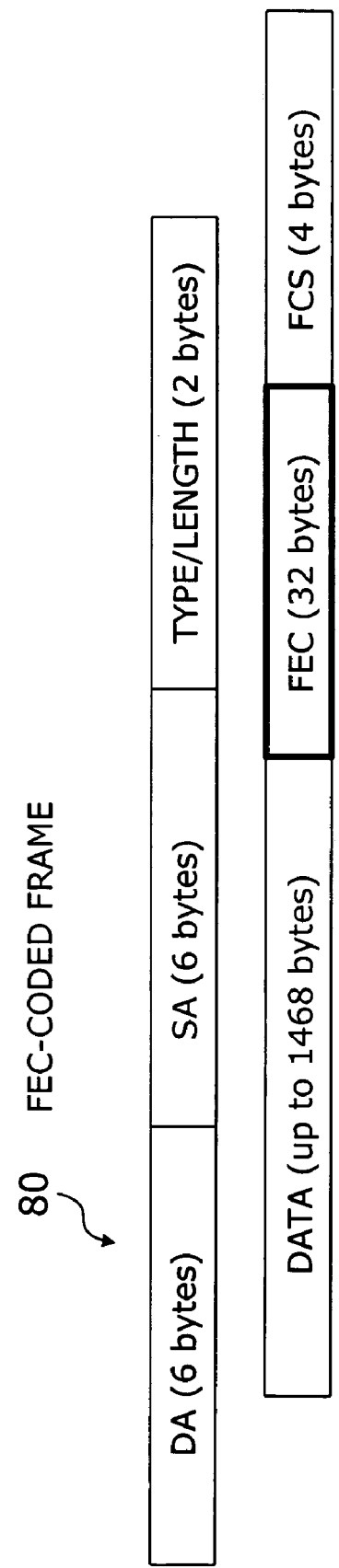
FIG. 11 shows a format of FEC-coded frames.

FIG. 11 shows a format of FEC-coded frames. The illustrated example frame 80 is an Ethernet frame carrying main data in an FEC-protected format. The frame 80 is composed of the following fields: "DA," "SA" "Type/Length," "Data," "FEC," and "FCS." As can be seen from FIG. 11, the Data field is followed by an FEC code. The length of this FEC field may not necessarily be fixed. Rather, the FEC field length may be varied in accordance with the current condition of the network, thereby optimizing the resilience to data loss. More specifically, the FEC field may be shortened when the transmission lines and network devices are in good condition, so that the data can be transported more efficiently.

Media Converter

This section describes in detail the internal structure and operation of the media converters 200 and 300 and L2 switches 100 and 400. While the following will explain one media converter 300, it should be appreciated that the other media converter 200 operates in the same way.

Figure 12:
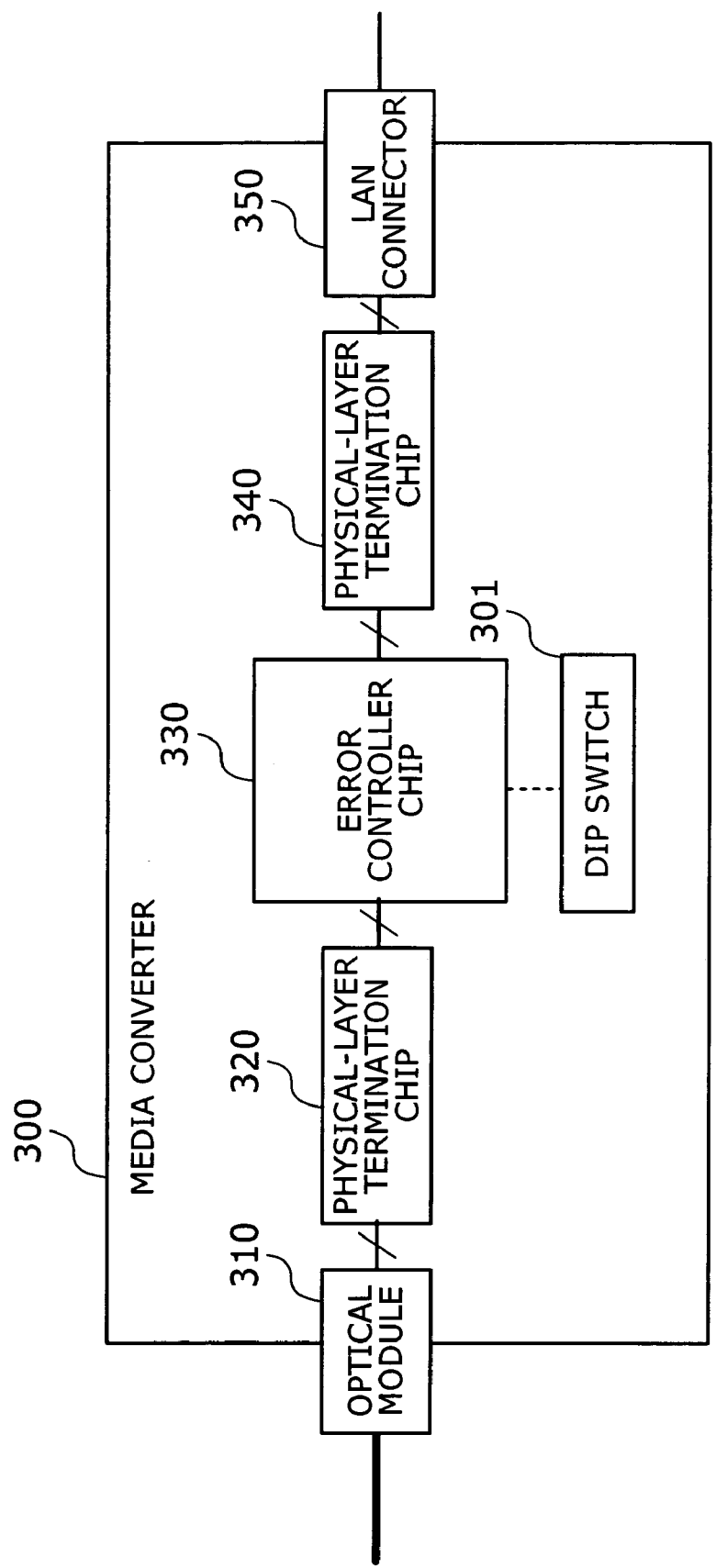
FIG. 12 is a block diagram showing the internal structure of a media converter.

FIG. 12 is a block diagram showing the internal structure of the media converter 300. The media converter 300 has a DIP switch 301, an optical module 310, a physical-layer termination chip 320, an error controller chip 330, a physical-layer termination chip 340, and a LAN connector 350.

As explained earlier in FIG. 3, the DIP switch 301 is used to specify a range of the number of receive frame errors that the media converter 300 tolerates. The optical module 310 is an interface device for bidirectional connection with a single-fiber optical transmission medium. Placed between the fiber-optic link 32 and the physical-layer termination chip 320, the optical module 310 serves as a bidirectional converter that converts an optical signal to an electrical signal and vice versa.

The physical-layer termination chip 320 is a large-scale integration (LSI) circuit for termination of physical-layer transmission signals. Specifically, the physical-layer termination chip 320 receives transmission signals through the optical module 310, terminates them, and supplies the outcomes to the error controller chip 330. The physical-layer termination chip 320 also receives signals from the error controller chip 330 and processes them for optical transmission via the optical module 310.

The error controller chip 330 is an LSI circuit for handling errors that the transmission signals may suffer during their travel over the fiber-optic link 32. The error controller chip 330 may be implemented by using a field-programmable gate array (FPGA) or an application specific integrated circuit (ASIC). The internal structure of this error controller chip 330 will be discussed later with reference to FIG. 13.

The physical-layer termination chip 340 is an LSI circuit for termination of physical-layer transmission signals. Specifically, the physical-layer termination chip 340 receives LAN transmission signals through the LAN connector 350, terminates them, and supplies the outcomes to the error controller chip 330. The physical-layer termination chip 340 also receives signals from the error controller chip 330 and processes them for transmission via the LAN connector 350. LAN connector 350 is a connector for LAN cable connection.

Figure 13:
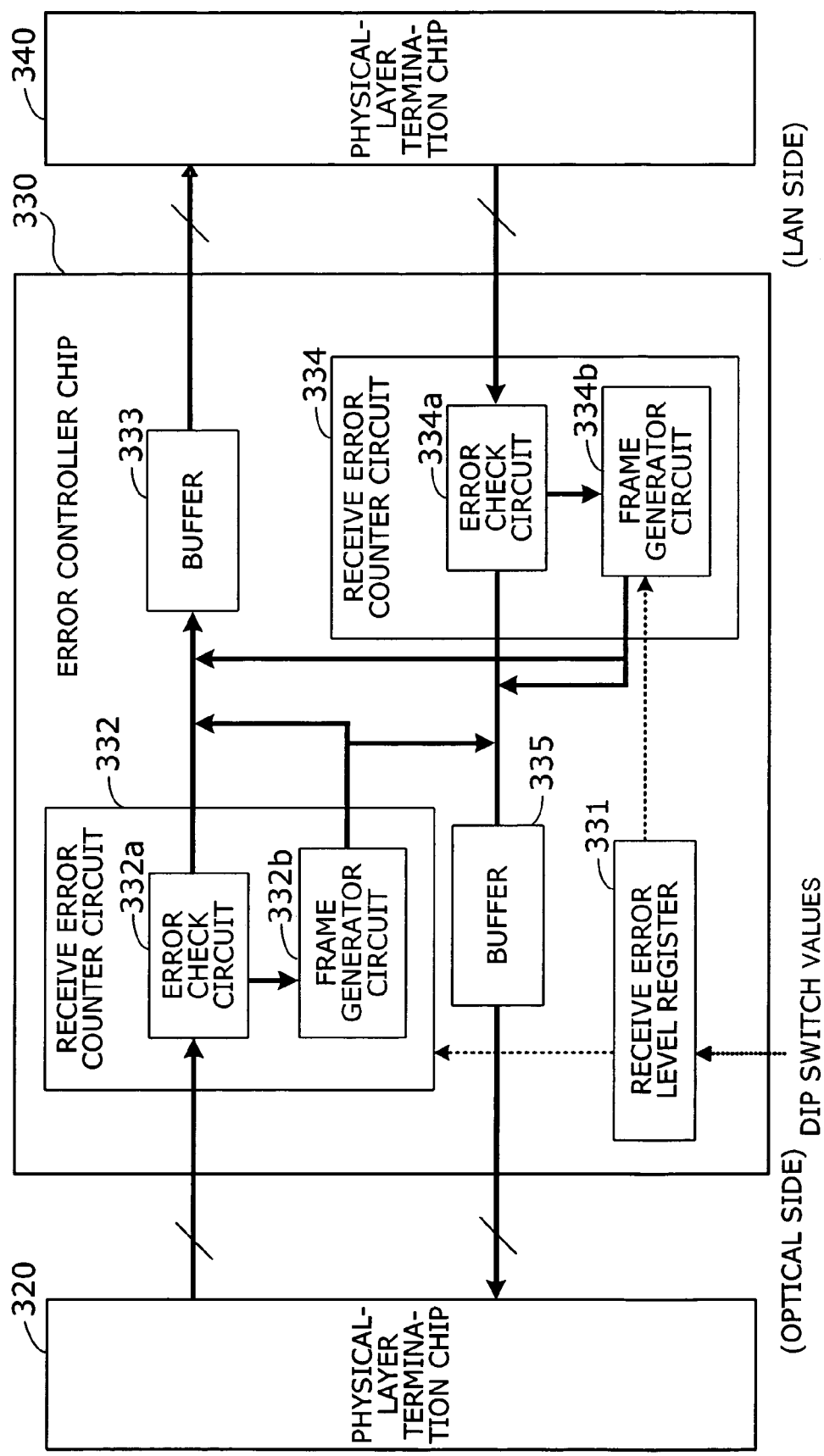
FIG. 13 is a block diagram showing the internal structure of an error controller chip.

FIG. 13 is a block diagram of the error controller chip 330. The error controller chip 330 has a receive error level register 331, receive error counter circuits 332 and 334, and buffers 333 and 335.

The receive error level register 331 is coupled to an external DIP switch 301, so that the value set in the DIP switch 301 will be copied into the receive error level register 331. More specifically, the DIP switch 301 is used to set a threshold of tolerable receive frame errors, and that threshold number is read into the receive error level register 331 for use within the error controller chip 330.

The receive error counter circuit 332 is coupled to the receive error level register 331, the optical-side physical-layer termination chip 320, and the LAN-side buffer 333. The receive error counter circuit 332 contains an error check circuit 332a and a frame generator circuit 332b. The error check circuit 332a determines whether there is an error in each received frame. For this purpose, the error check circuit 332a is disposed on the transmission data path between the physical-layer termination chip 320 and buffer 333. The frame generator circuit 332b produces error correction enable and disable frames and supplies them to both buffers 333 and 335.

The receive error counter circuit 332 operates as follows. Each time a received frame is supplied from the physical-layer termination chip 320, the error check circuit 332a checks whether it has an error or not, while directing the checked frame to the buffer 333. Also, the error check circuit 332a counts the total number of received frames, as well as the number of frames with errors. During this process of counting, the error check circuit 332a evaluates the current error rate calculated from the frame counts, in comparison with the threshold set in the receive error level register 331.

When the error rate exceeds the threshold, the error check circuit 332a sends a request signal to the frame generator circuit 332b to have it generate an error correction enable frame. The error check circuit 332a further sets an error correction frame sending flag to "1" so as to indicate that error correction enable frames will be transmitted.

The error rate may drop below the threshold set in the receive error level register 331 during a period when the error correction frame sending flag is "1." If this is the case, the error check circuit 332a requests the frame generator circuit 332b to generate an error correction disable frame, as well as resetting the error correction frame sending flag to "0."

The frame generator circuit 332b creates an error correction enable frame when so requested by the error check circuit 332a and sends it the buffer 333 and 335. Likewise, the frame generator circuit 332b creates an error correction disable frame when so requested by the error check circuit 332a and sends it the buffer 333 and 335. The buffer 333 serves as temporary storage of frames that the receive error counter circuit 332 has produced, before they are sent out one by one through the physical-layer termination chip 340.

Another receive error counter circuit 334, which is coupled to the LAN-side physical-layer termination chip 340, has an error check circuit 334a and frame generator circuit 334b, as in the receive error counter circuit 332 described above. The receive error counter circuit 334 functions in the same way as the foregoing receive error counter circuit 332, except that its output is directed to another buffer 335. The buffer 335 serves as temporary storage of frames that the receive error counter circuit 334 produces, before they are sent out one by one through the physical-layer termination chip 320.

Figure 14:
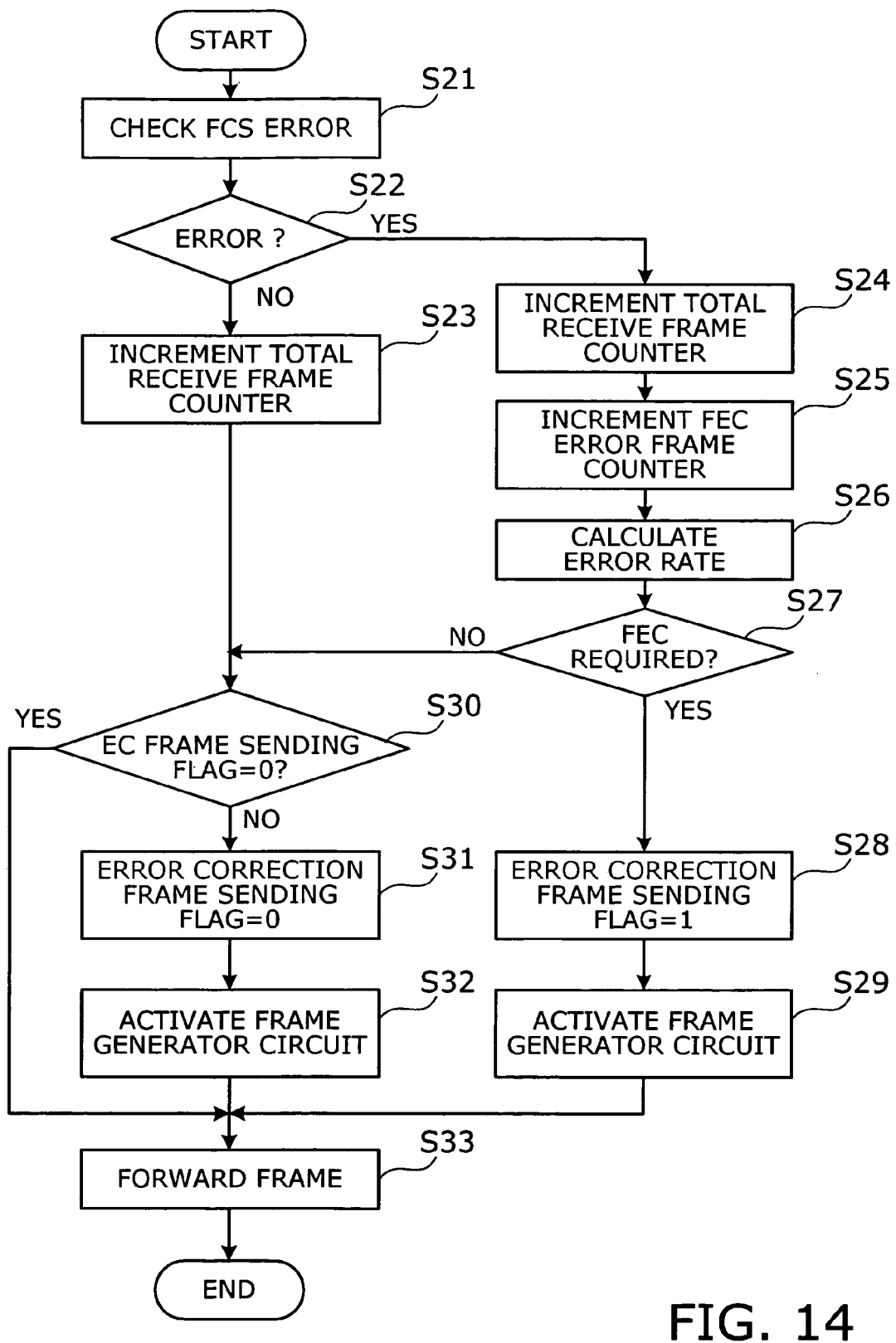
FIG. 14 is a flowchart showing the operation of an error check circuit.
Figure 15:
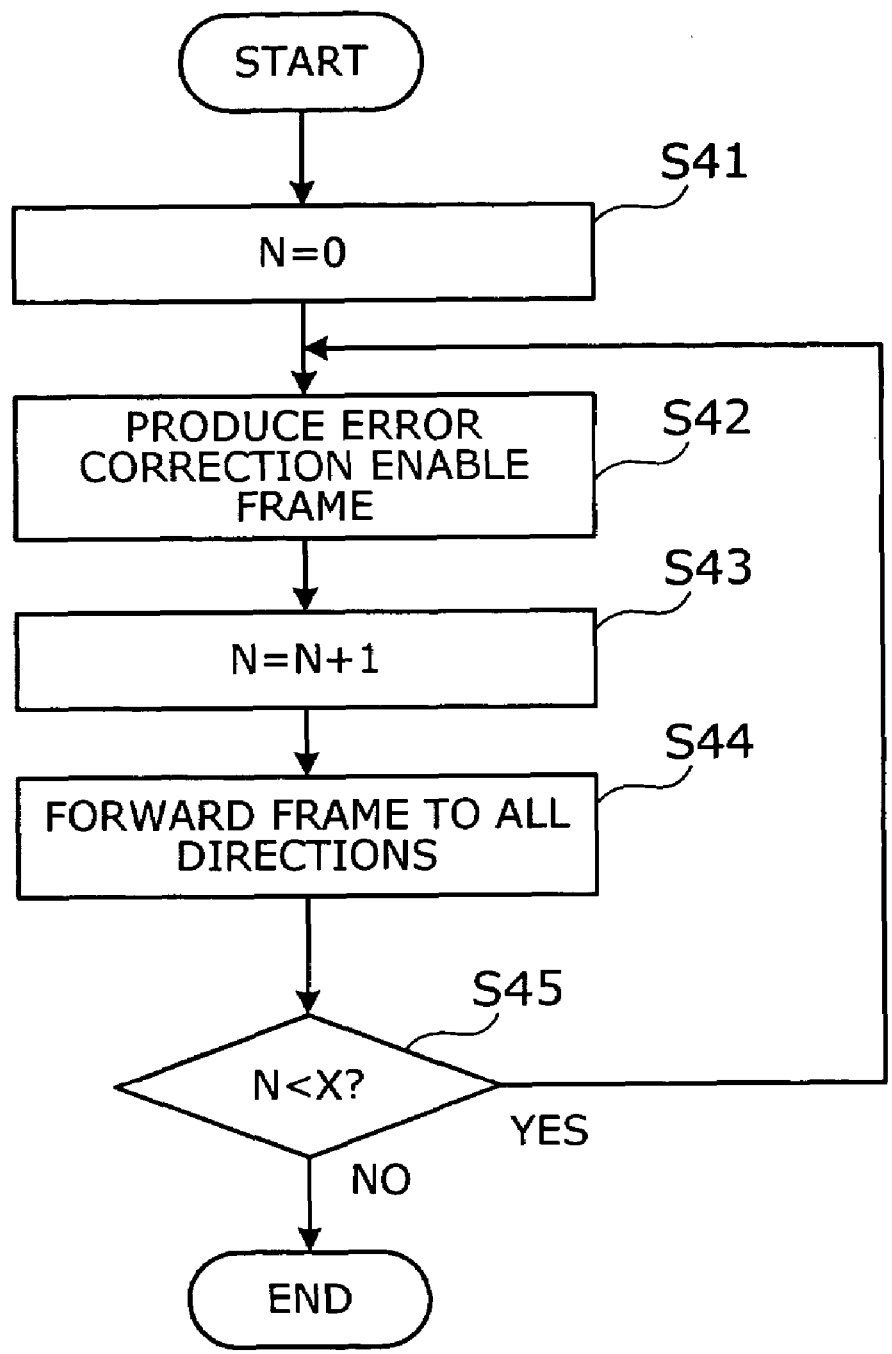
FIG. 15 is a flowchart showing how a frame generator circuit produces error correction enable frames.
Figure 16:
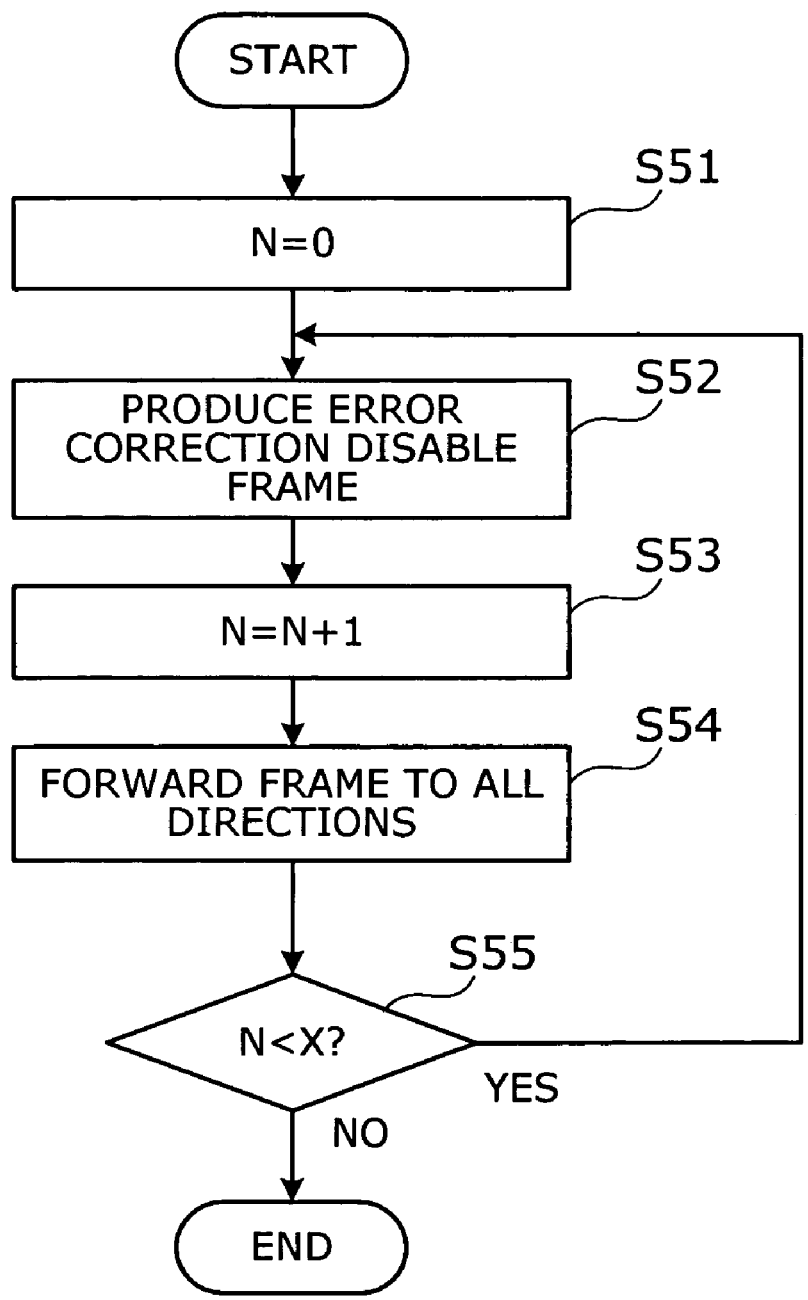
FIG. 16 is a flowchart showing how a frame generator circuit produces error correction disable frames.

Referring now to FIGS. 14 to 16, the operation of the error controller chip 330 will be described below. FIG. 14 is a flowchart showing how the error check circuit 334a operates, assuming that a frame is received from the physical-layer termination chip 320 on the optical side. The process of FIG. 14 includes the following steps:

(Step S21) The receive error counter circuit 332 checks FCS of the received frame. Specifically, it calculates a cyclic redundancy check (CRC) code of that frame.

(Step S22) The error check circuit 332a determines whether the frame has an error (i.e., data loss). Specifically, the error check circuit 332a compares the resulting CRC value of step S21 with the FCS field value of the received frame. If an FCS error is found, the process proceeds to step S24. If no error is found, the process advances to step S23.

(Step S23) The error check circuit 332a increments its total receive frame counter (not shown) by one. The process then advances to step S30.

(Step S24) The error check circuit 332a increments its total receive frame counter by one.

(Step S25) Since an FCS error is found, the error check circuit 332a increments its FCS error counter (not shown) by one.

(Step S26) The error check circuit 332a calculates the error rate (BER), the ratio of FCS errors to total receive frames.

(Step S27) The error check circuit 332a determines whether it is necessary to issue an FEC activation command. More specifically, the error check circuit 332a compares the current error rate calculated at step S26 with the threshold value set in the receive error level register 331. If the current error rate exceeds the threshold, then it is required to activate FEC. The process therefore proceeds to the next step S28. If FEC is not necessary, the process branches to step S30.

(Step S28) The error check circuit 332a sets the error correction frame sending flag to one.

(Step S29) The error check circuit 332a activates the frame generator circuit 332b by sending it a request signal for an error correction enable frame. The process then proceeds to step S33.

(Step S30) The error check circuit 332a determines whether the error correction frame sending flag is zero or one. If it is zero, then the process skips to step S33. If it is one, the process advances to step S31.

(Step S31) The error check circuit 332a clears the error correction frame sending flag to zero.

(Step S32) The error check circuit 332a activates the frame generator circuit 332b by sending a request signal for an error correction disable frame. The process then proceeds to step S33.

(Step S33) The error check circuit 332a forwards the received frame to the buffer 333.

The error check circuit 332a works as above, including activation of the frame generator circuit 332b to create error correction enable frames or error correction disable frames.

Referring to a flowchart of FIG. 15, the frame generator circuit 332b executes the following steps in response to a request signal for an error correction enable frame:

(Step S41) The frame generator circuit 332b initializes a variable N to zero.

(Step S42) The frame generator circuit 332b produces an error correction enable frame.

(Step S43) The frame generator circuit 332b increments N by one.

(Step S44) The frame generator circuit 332b forwards the error correction enable frame to all directions.

(Step S45) The frame generator circuit 332b tests whether N is still smaller than a predetermined setting value X (e.g., 100). If so, the process goes back to step S42, thus repeating transmission of the same error correction enable frame at steps S42 to S44. If N has reached X, the frame generator circuit 332b terminates the present process.

Through the above processing steps, the media converter 300 transmits error correction enable frames to L2 switches 100 and 400 in response to a failure detected by a hardware logic circuit.

Referring next to a flowchart of FIG. 16, the frame generator circuit 332b executes the following steps in response to a request signal for an error correction disable frame:

(Step S51) The frame generator circuit 332b initializes a variable N to zero.

(Step S52) The frame generator circuit 332b produces an error correction disable frame.

(Step S53) The frame generator circuit 332b increments N by one.

(Step S54) The frame generator circuit 332b forwards the error correction disable frame to all directions.

(Step S55) The frame generator circuit 332b tests whether N is still smaller than a predetermined setting value X (e.g., 100). If so, the process goes back to step S52, thus repeating transmission of the same error correction disable frame at steps S52 to S54. If N has reached X, the frame generator circuit 332b terminates the present process.

Through the above processing steps, a hardware logic circuit in the media converter 300 detects recovery from a failure, thus causing error correction disable frames to be transmitted to L2 switches 100 and 400.

Layer-2 Switch

Figure 17:
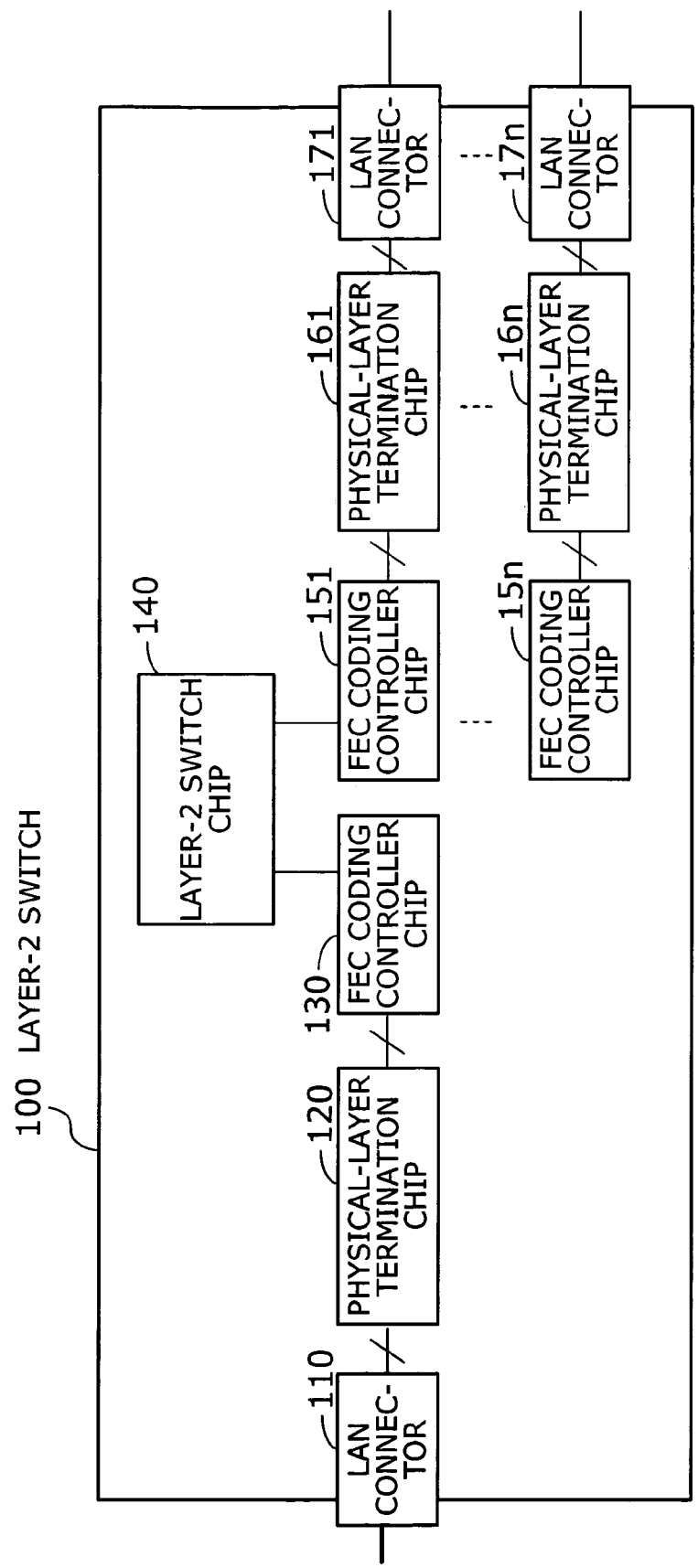
FIG. 17 is a block diagram showing the internal structure of an L2 switch.

This section describes in detail the internal structure and operation of the L2 switches 100 and 400. FIG. 17 is a block diagram showing the internal structure of the L2 switch 100. To serve n+1 LAN ports, the L2 switch 100 has the following elements: LAN connectors 110 and 171 to 17n, physical-layer termination chips 120 and 161 to 16n, and FEC coding controller chips 130 and 151 to 15n. The L2 switch 100 also has an L2 switch chip 140, to which all the FEC coding controller chips 130 and 151 to 15n are connected.

The LAN connectors 110 and 171 to 17n accept LAN cables, and the physical-layer termination chips 120 and 161 to 16n are LSI circuits for termination of physical-layer signals transmitted over those LAN cables. The physical-layer termination chip 120 terminates LAN signals received via the LAN connector 110 and supplies the outcome to the FEC coding controller chip 130. In addition, the physical-layer termination chip 120 receives signals from the FEC coding controller chip 130 and outputs them via the LAN connector 110. The other physical-layer termination chips 161 to 16n function in the same way as the physical-layer termination chip 120.

The FEC coding controller chips 130 and 151 to 15n determines whether to use error correction coding, according to error correction enable frames and error correction disable frames sent from the media converters 200 and 300. The L2 switch chip 140 forwards frame traffic from one FEC coding controller chip to another.

Figure 18:
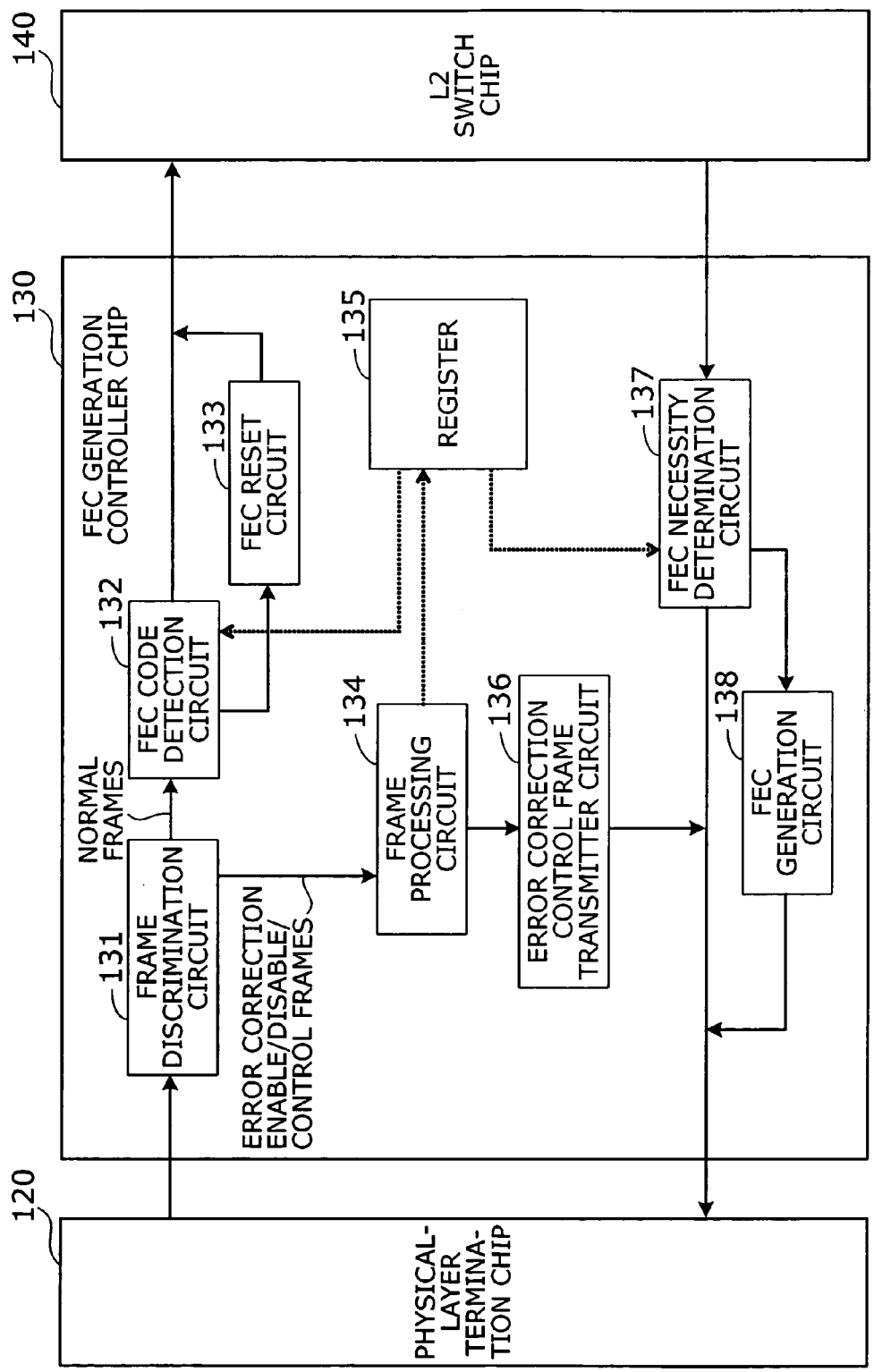
FIG. 18 is a block diagram showing the internal structure of an FEC coding controller chip.

FIG. 18 is a block diagram showing the internal structure of the FEC coding controller chip 130. The FEC coding controller chip 130 has the following elements: a frame discrimination circuit 131, an FEC code detection circuit 132, an FEC reset circuit 133, a frame processing circuit 134, a register 135, an error correction control frame transmitter circuit 136, an FEC necessity determination circuit 137, and an FEC coding circuit 138.

The frame discrimination circuit 131 is coupled to the physical-layer termination chip 120, FEC code detection circuit 132, and frame processing circuit 134. When a frame is given from the physical-layer termination chip 120, the frame discrimination circuit 131 tests whether it is an error correction enable frame, error correction disable frame, or error correction control frame. If the given frame is neither of them (meaning that it is a normal frame), the frame discrimination circuit 131 passes it to the FEC code detection circuit 132. If the given frame is either of the above-stated frames, the frame discrimination circuit 131 directs it to the frame processing circuit 134.

The FEC code detection circuit 132 is coupled to the FEC reset circuit 133, L2 switch chip 140, and register 135, in addition to the frame discrimination circuit 131 described above. When a normal frame is given from the frame discrimination circuit 131, the FEC code detection circuit 132 determines whether it is FEC coded. More specifically, the FEC code detection circuit 132 determines the presence of FEC by consulting an FEC-in-use flag in the register 135. FEC-in-use flag indicates whether FEC coding is used in the frames supplied from the physical-layer termination chip 120. If a frame is not FEC-coded, the FEC code detection circuit 132 sends that frame directly to the L2 switch chip 140. If a frame is FEC coded, the FEC code detection circuit 132 sends that frame to the FEC reset circuit 133. The FEC reset circuit 133 supplies such FEC-coded frames to the L2 switch chip 140 after removing their FEC codes.

The frame processing circuit 134 receives various administrative frames from the frame discrimination circuit 131 and executes different tasks depending on what frames they are. Specifically, in the case of an error correction enable frame, the frame processing circuit 134 sets a correction activation flag in the register 135 to indicate that the error correction function is activated. At the same time the frame processing circuit 134 generates a request signal to cause the error correction control frame transmitter circuit 136 to transmit an error correction control frame indicating the use of FEC.

In the case of an error correction disable frame, the frame processing circuit 134 clears the correction activation flag in the register 135 to indicate that the error correction function is deactivated. At the same time the frame processing circuit 134 produces a request signal to cause the error correction control frame transmitter circuit 136 to transmit an error correction control frame indicating the non-use of FEC.

In the case of an error correction control frame indicating the use of FEC, the frame processing circuit 134 sets an FEC-in-use flag in the register 135 to indicate that FEC coding is used in the frames supplied from the physical-layer termination chip 120. In the case of an error correction control frame indicating non-use of FEC, the frame processing circuit 134 clears the FEC-in-use flag in the register 135 to indicate that FEC coding is not used.

The register 135 is used to record the identifier of the source media converter of an error correction enable frame, as well as the FEC-in-use flag mentioned above. This register 135 is coupled to the FEC necessity determination circuit 137 described later, in addition to the frame processing circuit 134 and FEC code detection circuit 132.

The error correction control frame transmitter circuit 136 is coupled to the physical-layer termination chip 120, in addition to the frame processing circuit 134. The error correction control frame transmitter circuit 136 produces error correction control frames according to a command from the frame processing circuit 134 and supplies them to the physical-layer termination chip 120.

The FEC necessity determination circuit 137 is coupled to the L2 switch chip 140, FEC coding circuit 138, and physical-layer termination chip 120, in addition to the register 135. The role of this FEC necessity determination circuit 137 is to determine whether to add an FEC code to frames supplied from the L2 switch chip 140, consulting the correction activation flag in the register 135. If FEC is necessary, the FEC necessity determination circuit 137 routes those supplied frames to the FEC coding circuit 138. If FEC is not required, the FEC necessity determination circuit 137 allows the frames to pass through to the physical-layer termination chip 120.

The FEC coding circuit 138 is coupled to the physical-layer termination chip 120, in addition to the FEC necessity determination circuit 137. Upon receipt of a frame from the FEC necessity determination circuit 137, the FEC coding circuit 138 calculates its FEC code for attachment to that frame, thus providing the physical-layer termination chip 120 with an FEC-coded frame.

Figure 19:
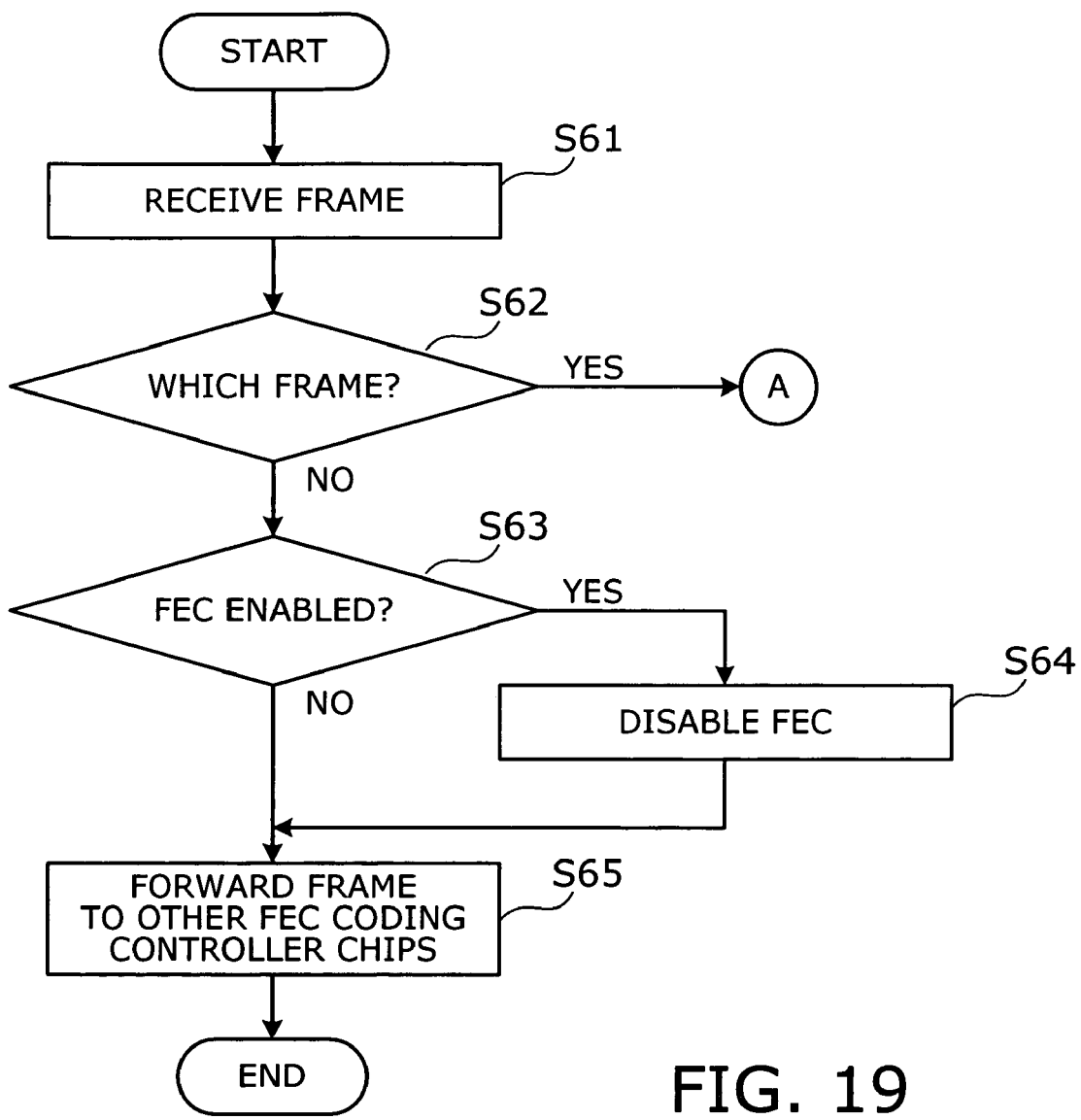
FIGS. 19, 20, and 21 are first, second, and third parts of a flowchart showing how input frames are processed by an FEC coding controller chip.
Figure 20:
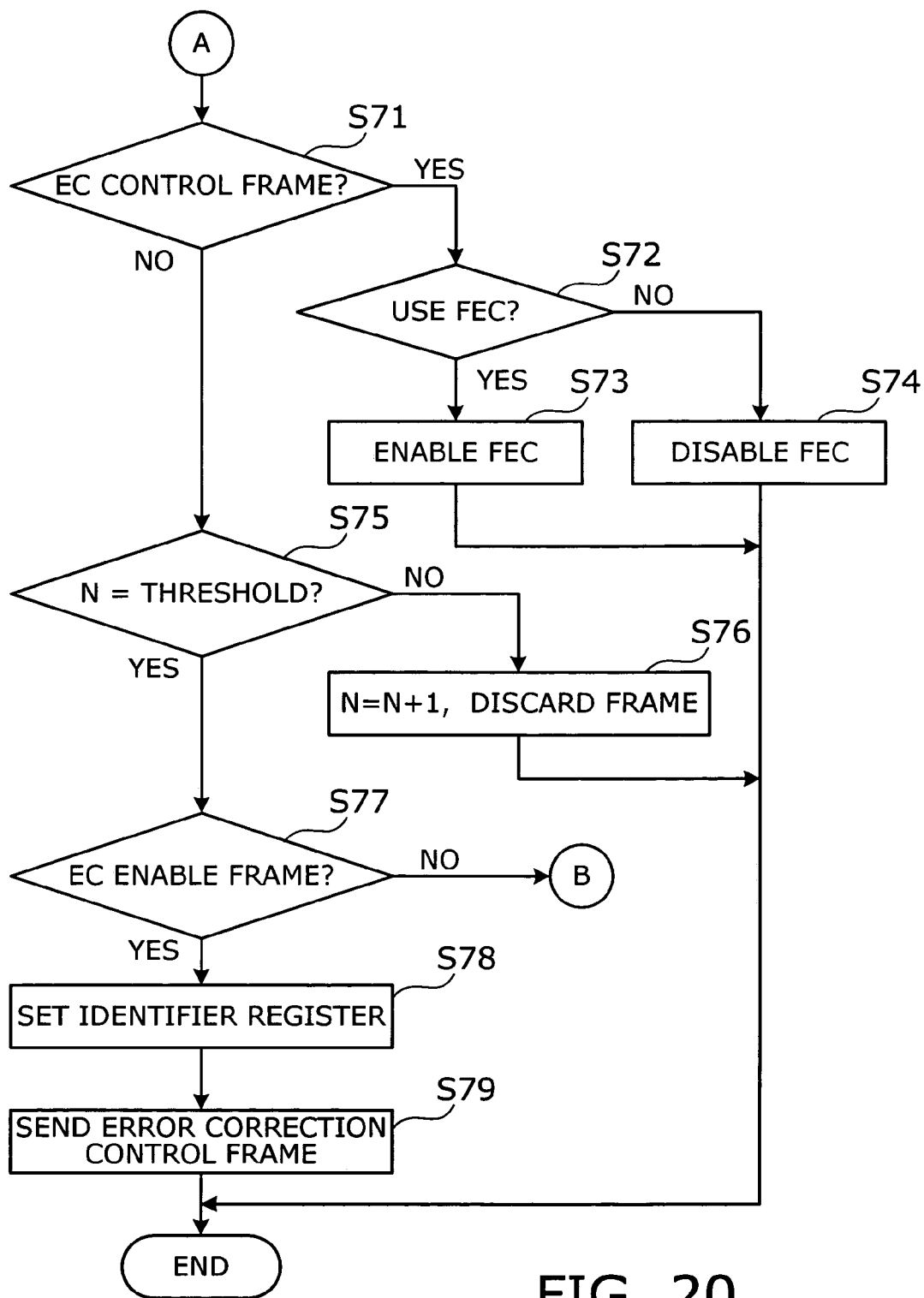
Figure 21:
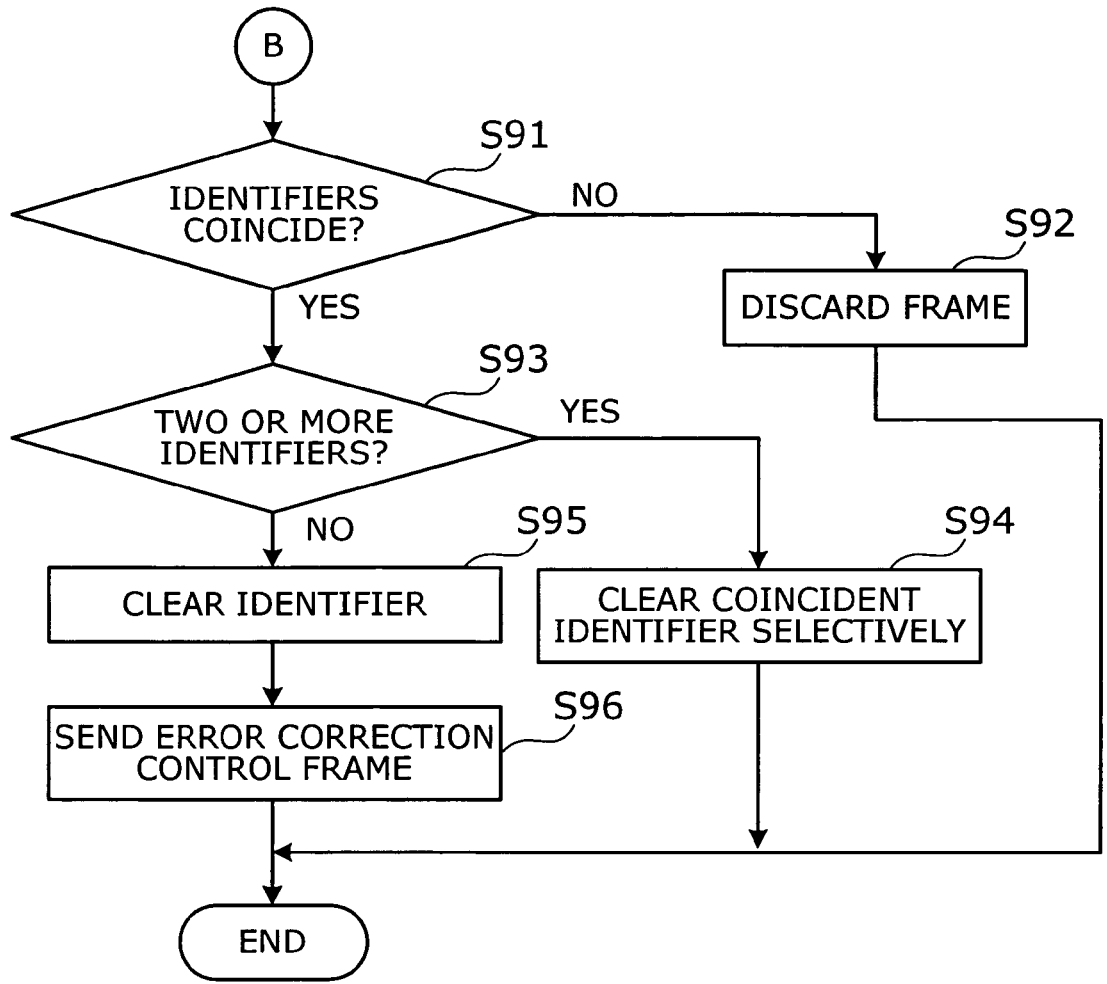

Referring now to the flowcharts of FIGS. 19 to 21, the following will explain how incoming LAN frames are manipulated inside the L2 switch 100. FIG. 19 is a first flowchart showing how the FEC coding controller chip 130 processes input frames. This process includes the following steps:

(Step S61) The physical-layer termination chip 120 passes a received frame to the FEC coding controller chip 130.

(Step S62) The given frame may be an error correction enable frame, error correction disable frame, or error correction control frame. The frame discrimination circuit 131 in the FEC coding controller chip 130 tests which frame it is. If the frame falls within the above-stated category, the frame discrimination circuit 131 directs it to the frame processing circuit 134, and the process advances to step S71 (see FIG. 20). If not (i.e., it is a normal frame), then the frame is passed to the FEC code detection circuit 132, and the process advances to step S63.

(Step S63) The FEC code detection circuit 132 determines whether the frame is FEC coded. If so, the frame is passed to the FEC reset circuit 133, and the process advances to step S64. Otherwise, the frame is passed to the L2 switch chip 140, and the process advances to step S65.

(Step S64) The FEC reset circuit 133 passes the given frame to the L2 switch chip 140 after removing its FEC code.

(Step S65) The L2 switch chip 140 forwards the frame to one of the other FEC coding controller chips 151 to 15n.

FIG. 20 is a second part of the flowchart showing how the FEC coding controller chip 130 processes given frames. The flowchart includes the following steps:

(Step S71) The frame processing circuit 134 determines whether the given frame is an error correction (EC) control frame. If so, the process advances to step S72. If not (i.e., it is an error correction enable frame or an error correction disable frame), the process proceeds to step S75.

(Step S72) The frame processing circuit 134 examines whether the error correction control frame indicates the use of FEC or non-use of FEC. In the former case, the process advances to step S73. In the latter case, the process proceeds to step S74.

(Step S73) The frame processing circuit 134 sets an FEC-in-use flag in the register 135 to indicate that the subsequent frames will be FEC coded. The process is thus terminated.

(Step S74) The frame processing circuit 134 clears the FEC-in-use flag in the register 135 to indicate that the subsequent frames will not be FEC coded. The process is thus terminated.

(Step S75) Now that the received frame has turned out to be an error correction enable frame or an error correction disable frame, the frame processing circuit 134 determines how many such frames have been received consecutively. More specifically, the number of received error correction enable frames or error correction disable frames is given as a variable N, and the frame processing circuit 134 tests whether N has reached a threshold set for protection against false detection. If N equals the threshold, it means that the L2 switch 100 have received a sufficient number of such frames, and the process thus advances to step S77.

(Step S76) The frame processing circuit 134 increments N by one, while discarding the received frame. The process is then terminated.

(Step S77) Now that the number of received frames has reached the predetermined protection threshold, the frame processing circuit 134 then determines whether those frames are error correction enable frame or error correction disable frames. In the case of error correction enable frames, the process advances to step S78. In the case of error correction disable frames, the process branches to step S91 (see FIG. 21).

(Step S78) The frame processing circuit 134 updates the register 135 with the identifier of the source media converter that issued those error correction enable frames.

(Step S79) The frame processing circuit 134 commands the error correction control frame transmitter circuit 136 to transmit an error correction control frame indicating the use of FEC. According to this command, the error correction control frame transmitter circuit 136 transmits an error correction control frame through the corresponding physical-layer termination chip 120. The process is then terminated.

FIG. 21 is a third part of the flowchart showing how the FEC coding controller chip 130 processes given frames. The flowchart includes the following steps:

(Step S91) The received error correction disable packet contains an identifier that indicates its source media converter. The frame processing circuit 134 tests whether the identifier in the frame coincides with that in the register 135. If the two identifiers coincide with each other, the process advances to step S93. If not, the process proceeds to step S92.

(Step S92) Because of the disagreement of identifiers, the frame processing circuit 134 discards the received frame and exits from the present process.

(Step S93) With the coincidence of the identifiers, the frame processing circuit 134 then looks into the register 135 to find whether there are two or more identifiers. If so, the process advances to step S94. If no other identifiers are found, the process advances to step S95.

(Step S94) The frame processing circuit 134 clears selectively the coincident identifier in the register 135, while leaving the others intact. The process is then terminated.

(Step S95) The frame processing circuit 134 clears the only identifier in the register 135.

(Step S96) The frame processing circuit 134 commands the error correction control frame transmitter circuit 136 to transmit an error correction control frame indicating the non-use of FEC. According to this command, the error correction control frame transmitter circuit 136 transmits an error correction control frame through the corresponding physical-layer termination chip 120. The process is then terminated.

Figure 22:
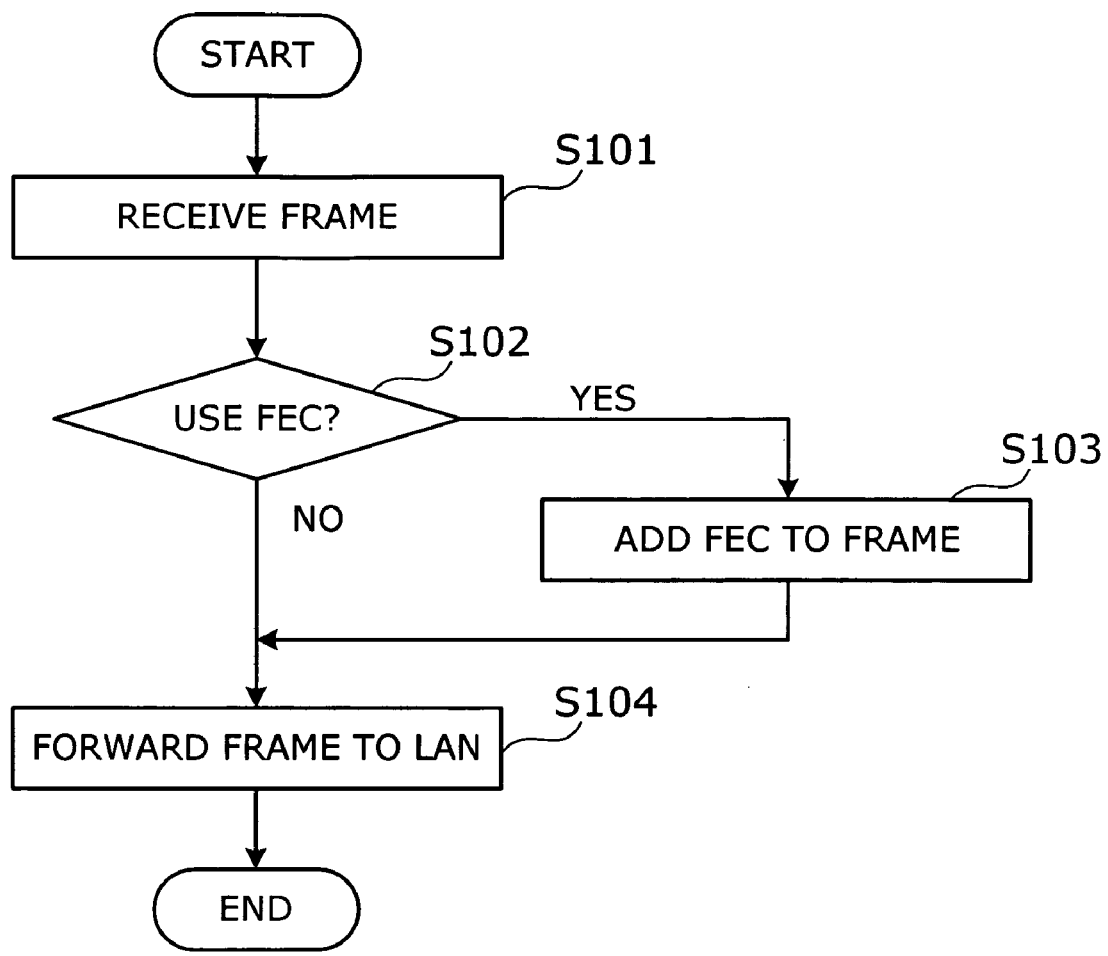
FIG. 22 is a flowchart showing how the FEC coding controller chip processes output frames.

Referring next to a flowchart of FIG. 22, the following will discuss how the FEC coding controller chip 130 processes output frames supplied from the L2 switch chip 140 before they are sent out to the LAN. The process of FIG. 22 includes the following steps:

(Step S101) The FEC necessity determination circuit 137 receives a frame from the L2 switch chip 140.

(Step S102) With reference to a relevant FEC-in-use flag in the register 135, the FEC necessity determination circuit 137 determines whether to use FEC. If the FEC-in-use flag is set, then the FEC necessity determination circuit 137 supplies the received frame to the FEC coding circuit 138 and advances the process to step S103. If the flag is cleared, the FEC necessity determination circuit 137 outputs the frame to the physical-layer termination chip 120 and advances the process to step S104.

(Step S103) The FEC coding circuit 138 calculates an FEC code from the given frame, thus providing the physical-layer termination chip 120 with an FEC-coded version of that frame.

(Step S104) The physical-layer termination chip 120 transmits the given frame through the LAN connector 110.

The above-described mechanism of adaptive error correction avoids degradation of service quality even in a system formed from CPU-less, physical-layer network devices. The system enables or disables its error correction coding function in an adaptive manner, depending on the actual error rate of communication. That is, error correction is disabled when no communication errors are observed. Error correction is activated to ensure the data integrity when errors occur at a predetermined rate.

The above functions can be embodied without using CPU or its peripheral components (e.g., memory). The present invention thus contributes to miniaturization of network devices, besides reducing power consumption. Also, the users can set their desired quality levels by simply flipping some switches (e.g., DIP switch) on and off.

Failure detection and error correction coding could incur some overhead in processing frames, which leads to a lower throughput of network devices. The present embodiment, however, realizes these functions without using CPUs, thereby minimizing the drop of transmission rates while ensuring the reliability of data communications. This feature meets today's market needs, where the network speed is of greater importance.

Dual-fiber Optical Transmission Line

The present invention should not be limited to the above-described embodiments. Rather, it should be appreciated that one can make various modifications to the foregoing embodiments without going out of the scope of the present invention. For example, the media converters may have a dual-fiber optical module, instead of a single-fiber bidirectional optical module, for use of two optical fibers as transmission media.

Figure 23:
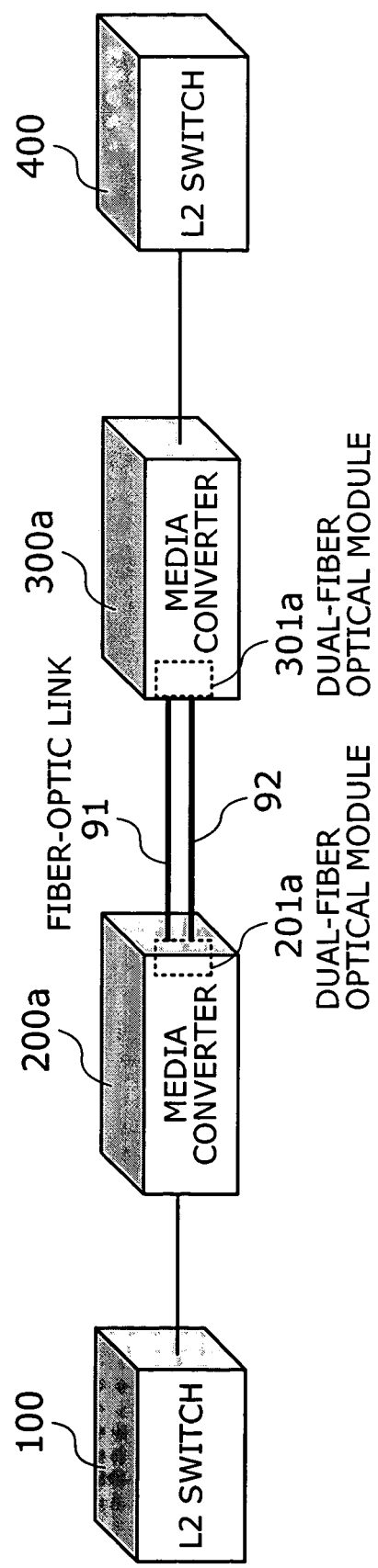
FIG. 23 shows an example implementation using dual-fiber optical modules.
Figure 24:
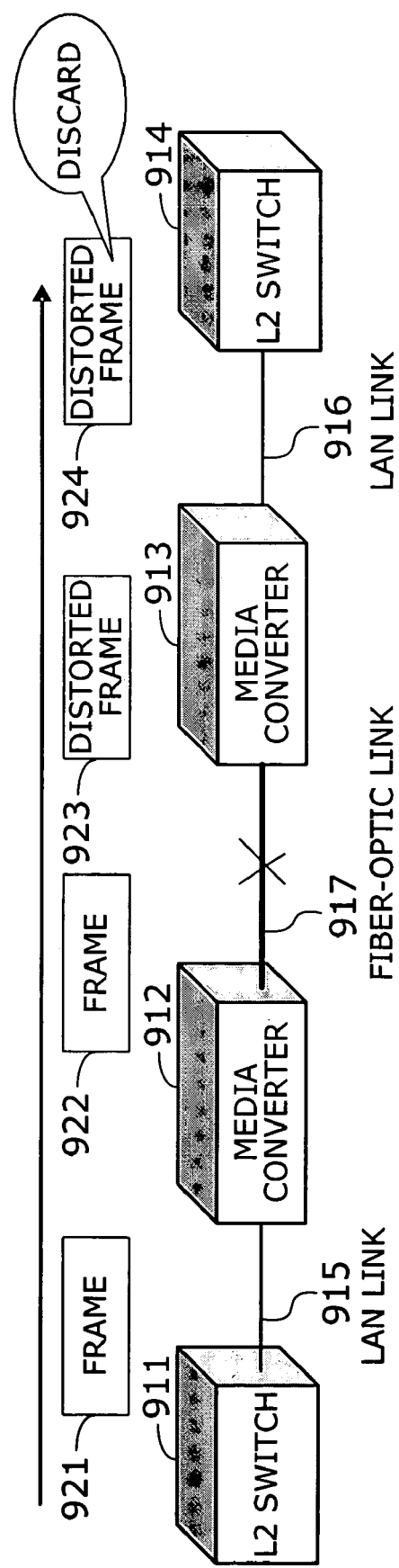
FIG. 24 shows a first example of a conventional data communications system.
Figure 25:
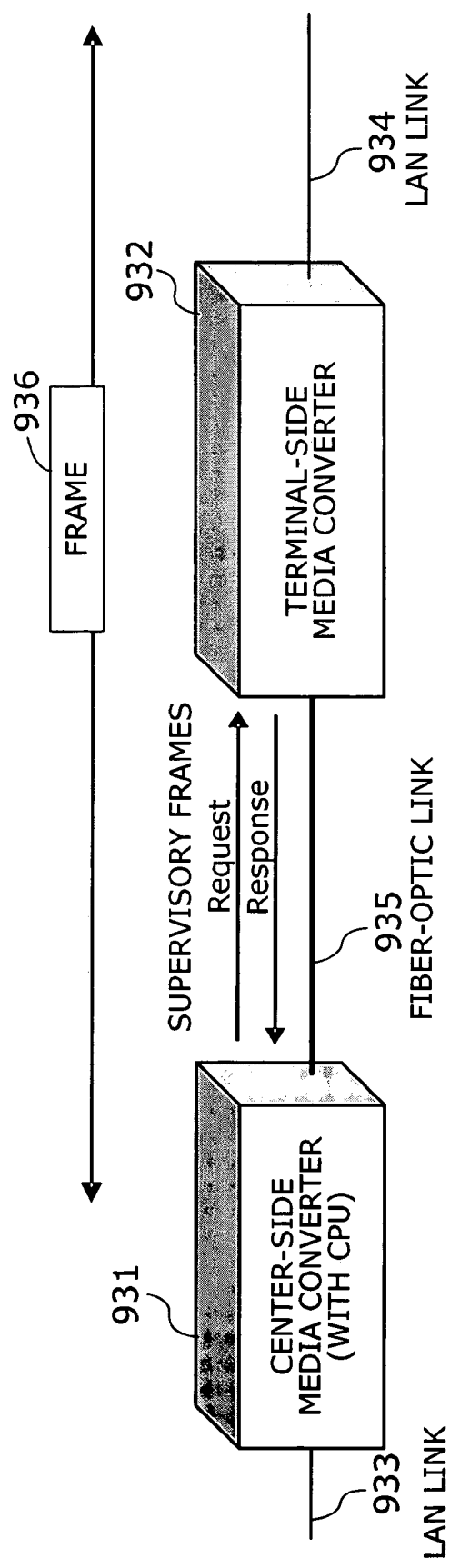
FIG. 25 shows a second example of a conventional data communications system.
Figure 26:
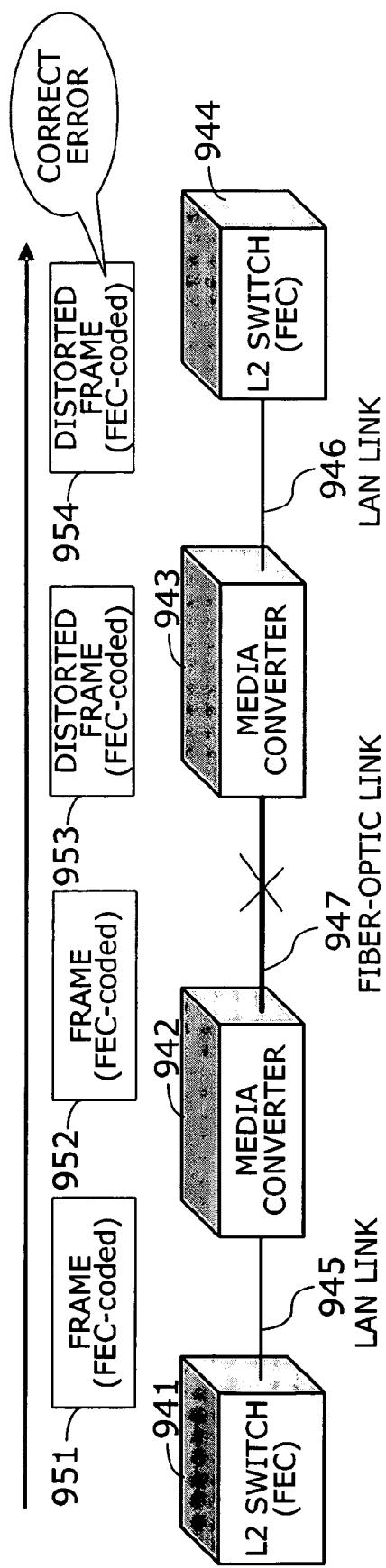
FIG. 26 shows a third example of a conventional data communications system.

FIG. 23 shows an example implementation using dual-fiber optical modules. In the illustrated system, two media converters 200a and 300a are interconnected by a pair of fiber-optic links 91 and 92. The two media converters 200a and 300a have dual-fiber optical modules 201a and 301a for their respective optical cable connections, thus enabling signals to be transported in either directions over the fiber-optic links 91 and 92. The media converters 200a and 300a are formed from the same functional elements as those of the foregoing media converters 200 and 300 (FIG. 2), except for their optical modules.

Computer-Implemented Error Control

The above-described functions of the error controller chip 330 and FEC coding controller chip 130 may also be implemented as software programs for use with one or more microprocessors, in the case where their moderate performance and increased cost can be justified. That is, the functions of each device is described as a series of instructions and provided in the form of computer programs. A microprocessor executes those programs to provide the intended functions of the present invention. For the purpose of storage and distribution, the programs are stored in a computer-readable storage medium. Suitable computer-readable storage media include magnetic storage media, optical discs, magneto-optical storage media, and semiconductor memory devices. Magnetic storage media include hard disk drives (HDD), flexible disks (FD), and magnetic tapes. Optical discs include digital versatile discs (DVD), DVD-RAM, compact disc read-only memory (CD-ROM), CD-Recordable (CD-R), and CD-Rewritable (CD-RW). Magneto-optical storage media include magneto-optical discs (MO).

Portable storage media, such as DVD and CD-ROM, are suitable for the distribution of program products. Network-based distribution of software programs is also possible, in which master program files are made available in a server computer for downloading to other computers via a network.

A user computer stores necessary programs in its local storage unit, which have previously been installed from a portable storage media or downloaded from a server computer. The computer executes the programs read out of the local storage unit, thereby performing the programmed functions. As an alternative way of program execution, the computer may execute programs, reading out program codes directly from a portable storage medium. Another alternative method is that the user computer dynamically downloads programs from a server computer when they are demanded and executes them upon delivery.

CONCLUSION

According to the present embodiment, the data repeating device is designed to detect a failure from errors found in received frames and to transmit an error correction enable frame to network devices operating at the data link layer or above. Error correction enable frames allow those upper-layer devices to know the occurrence of a failure and start using error correction coding in transmission of subsequent frames. The use of error correction coding permits the network system to maintain the quality of service even when it is in error-prone conditions.

Also, according to the present embodiment, the data communications device is designed to add an error correction code to each outgoing frame to be transmitted, after an error correction enable frame is received from a physical-layer data repeating device. This mechanism maintains the quality of service when a failure is detected by the data repeating device.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A data repeating device repeating network data signals at a physical layer, comprising:
   error detection means for detecting a failure and recovery therefrom, based on an error rate of received frames; and
   frame generating means for producing and transmitting an error correction enable frame to a network device that processes network data at a data linked layer or above in response to the failure detection by said error detection means, and for requesting the network device to start using error correction coding, and for producing and transmitting an error correction disable frame to the network device in response to the failure recovery detected by said error detection means, and for requesting the network device to stop using the error correction coding.

2. The data repeating device according to claim 1, wherein said error detection means detects a failure when the received frames exhibit an error rate greater than a predetermined threshold.

3. The data repeating device according to claim 2, further comprising a switch for setting the threshold.

4. The data repeating device according to claim 2, wherein said error detection means interprets the error rate having fallen below the threshold as the recovery from the failure.

5. The data repeating device according to claim 1, wherein:
   said error detection means is implemented as an error check circuit coupled to one transmission line over which the frames are received;
   said frame generating means is implemented as a frame generator circuit coupled to the error check circuit and to outgoing transmission lines;
   the error check circuit sends a request signal to the frame generator circuit upon detection of the failure; and
   the frame generator circuit produces the error correction enable frame in response to the request signal from the error check circuit and directs the produced error correction enable frame to all the outgoing transmission lines.

6. The data repeating device according to claim 1, wherein said frame generating means adds an identifier to the error correction enable frame so as to distinguish the data repeating device itself from other data repeating devices.

7. A method of repeating network data signals at a physical layer, the method being implemented in a data repeating device and comprising the steps of:
   detecting a failure, based on errors found in received frames;
   producing and transmitting, in response to the detection of the failure, an error correction enable frame to a network device that processes network data at a data linked layer or above;
   requesting the network device to start using error correction coding;
   detecting recovery from the failure, based an error rate of received frames;
   producing and transmitting an error correction disable frame to the network device in response to the recovery from the failure; and
   requesting the network device to stop using the error correction coding.

* * * * *